US012508910B2

(12) United States Patent
Tulit et al.

(10) Patent No.: US 12,508,910 B2
(45) Date of Patent: Dec. 30, 2025

(54) IMMERSIVE MEDIA RENDERING WITH VEHICLE COMPONENTS

(71) Applicant: VOLKSWAGEN AKTIENGESELLSCHAFT, Wolfsburg (DE)

(72) Inventors: Vince Tulit, San Mateo, CA (US); Enes Olcay, Redwood City, CA (US); Loren Skelly, San Francisco, CA (US); Evaristo Galamay, Danville, CA (US); Joseph Andrew Sisk, San Jose, CA (US); Gerardo Alberto Rossano Herrera, Saratoga, CA (US)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 273 days.

(21) Appl. No.: 18/511,372

(22) Filed: Nov. 16, 2023

(65) Prior Publication Data

US 2025/0162418 A1     May 22, 2025

(51) Int. Cl.
*B60K 35/80*     (2024.01)
*B60K 35/26*     (2024.01)

(52) U.S. Cl.
CPC .............. *B60K 35/80* (2024.01); *B60K 35/26* (2024.01); *B60K 2360/164* (2024.01); *B60K 2360/167* (2024.01)

(58) Field of Classification Search
CPC .. B60K 35/80; B60K 35/26; B60K 2360/164; B60K 2360/167
See application file for complete search history.

(56) References Cited

U.S. PATENT DOCUMENTS

| 10,237,707 | B1 | 3/2019 | Sharp et al. |
| 10,417,298 | B2 | 9/2019 | Scannell, Jr. |
| 10,671,338 | B2 | 6/2020 | Liusaari et al. |
| 10,768,000 | B2 | 9/2020 | Alonso et al. |
| 2011/0082616 | A1 | 4/2011 | Small et al. |
| 2011/0137437 | A1 | 6/2011 | Jonsson |
| 2012/0253580 | A1 | 10/2012 | Al-Mahnna |

(Continued)

OTHER PUBLICATIONS

United States Patent and Trademark Office, U.S. Appl. No. 18/511,293, Non-Final Office Action dated Jun. 20, 2025.

(Continued)

*Primary Examiner* — Yuen Wong
(74) *Attorney, Agent, or Firm* — Shield Intellectual Property PC; Zhichong Gu

(57) ABSTRACT

Approaches, techniques, and mechanisms are disclosed for immersive media rendering with vehicle components. According to one embodiment, an immersive media content to be played back in a vehicle is identified. Audio data and vehicle component control metadata are determined in the immersive media content. The audio data is used to generate sound waves with audio speakers of the in-vehicle audio system to produce an in-vehicle sound field for a user inside the vehicle to audibly perceive. The vehicle component control metadata is used to perform actions of vehicle components of the vehicle. The actions of the vehicle components are synchronized by way of the vehicle component control metadata to specific playback times in a playback time duration represented in the immersive media content.

21 Claims, 33 Drawing Sheets

(56) References Cited

U.S. PATENT DOCUMENTS

| | | |
|---|---|---|
| 2014/0136100 A1 | 5/2014 | Drysdale |
| 2015/0345984 A1 | 12/2015 | Graham |
| 2016/0097646 A1 | 4/2016 | Alonso et al. |
| 2020/0329342 A1* | 10/2020 | Beaurepaire ........... B60K 35/29 |
| 2020/0382911 A1 | 12/2020 | Nissen et al. |
| 2025/0164275 A1 | 5/2025 | Tulit et al. |

OTHER PUBLICATIONS

United States Patent and Trademark Office, U.S. Appl. No. 18/511,293, Final Office Action dated Sep. 16, 2025.

* cited by examiner

| Start Time Duration | Trigger Action | Checks before action | Action | Signals |
|---|---|---|---|---|
| BEFORE START | | 1. check if doors, windows, sunroof, trunk is closed 2. check occupancy of vehicle 3. check seatbelts | read status from CAN | car ON/OFF doors status (open/closed) windows status (opening in %) sunroof status (opening in % + orientation) trunk lid status (opening in %) seat occupancy (front row only) seatbelts (front and rear) |
| START 0:00:40.625 | trunk opens | check trunk status | open trunk lid | |
| START 0:00:46.125, DURATION 9 SECONDS | car shakes, seats vibrate | | shake seat | |

*FIG. 1F*

IMMERSIVE MEDIA RENDERING WITH VEHICLE COMPONENTS

TECHNICAL FIELD

Embodiments relate generally to in-vehicle media rendering system, and, more specifically, to immersive media rendering with vehicle components in vehicles.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

While driving a vehicle, it is difficult for a driver to find nearby locations that may be of interest. While a mobile device such as a wireless handset might be used to do such searches, relatively lengthy and engaging interactive haptic gestures would be needed to operate the mobile device at a close eye distance. It will be too distracting for the driver to do so. In many jurisdictions, drivers may not even be allowed to have distractive interactions with their mobile devices while driving.

In addition, wider image displays and better audio systems have been more and more incorporated into vehicles, especially high-end models. Nevertheless, the full media rendering capabilities of these human machine interfaces and systems as well as other components in the vehicles remain unexploited for many different reasons.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1F illustrates example vehicle component algorithm using content metadata.

DETAILED DESCRIPTION

Figure 1A:
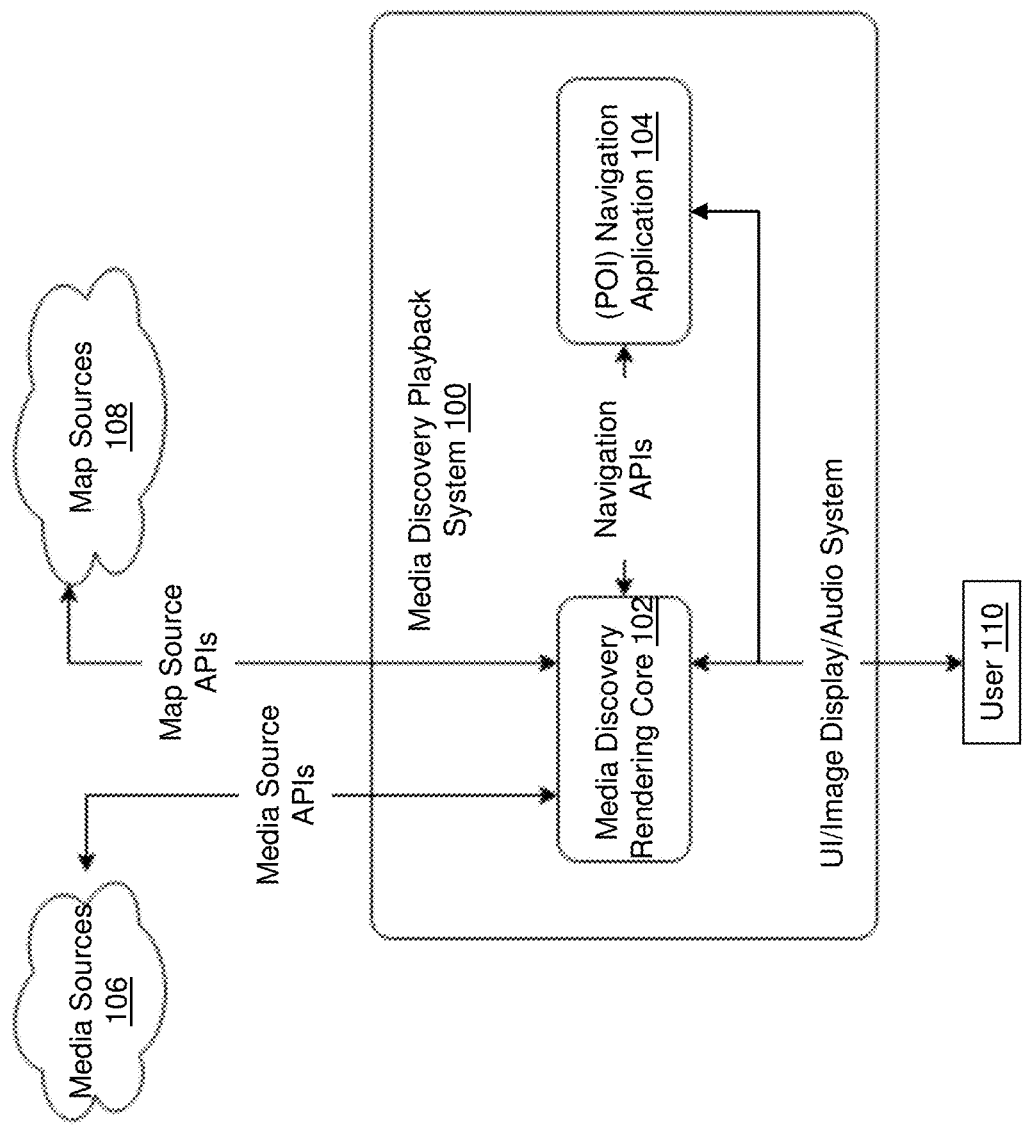
FIG. 1A and FIG. 1B illustrate an example in-vehicle media rendering and navigation system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
 1.0. General Overview
 2.0. Structural Overview
  2.1. Discovery and Playback Core
  2.2. Media Content Sources
  2.3. Map Sources
  2.4. POI Navigation Application
  2.5. User Interface and Media Rendering
  2.6. Vehicle Components and Gateway
  2.7. Miscellaneous
 3.0. Functional Overview
  3.1. Integrated UI Operations
  3.2. Concurrent UI Operations
  3.3. Initializing Discovery and Playback
  3.4. Discovering POIs
  3.5. Map Updating and User Selection
  3.6. Automatic POI Updating
  3.7. POI Media Rendering
  3.8. Vehicle Components as Rendering Media
  3.9. Vehicle Components Rendering Operations
 4.0. Example Process Flows
 5.0. Implementation Mechanism-Hardware Overview
 6.0. Extensions and Alternatives

1.0. General Overview

Techniques as described herein can be implemented in a media system deployed within a vehicle for the vehicle's driver to discover and playback media contents or audio stories relating to the vehicle's current position, destination or route without distracting the driver from safely operating the vehicle. In addition, these techniques can be implemented to free the driver from needing or asking a passenger to search for media contents or audio stories.

Hence, these techniques enable the driver to acquire an integrated navigation experience with which the driver concurrently searches for and consumes discovered media contents. For example, the driver can listen to immersive audio, drive with live navigation, and explore media contents or audio stories relating to interesting locations near the vehicle's current position, destination or route, all at the same time.

The vehicle may be equipped with a relatively wide display screen (e.g., 15 inch, larger than 5 or 6 inch mobile device screen, etc.) in which a relatively large navigation map up to a full screen map can be displayed or rendered along with easy-to-operate user interface (UI) controls such as icons, popups or menus in designated areas/regions on the image display or display screen to perform media discovery and playback operations.

The driver or user alone can use relatively simple and less distracting haptic gestures such as tapping or swiping, pulling down, etc., to discover, access, select, stream, or play/consume, available media contents or audio stories including but not necessarily limited to only those discovered based on the vehicle's current position, destination or route. Media contents or audio stories of different categories may be automatically and efficiently discovered and aggregated from a wide variety of different media content creators, producers, vendors, providers or sources.

By way of example, a driver or user may drive a vehicle either alone or with passenger(s) from San Francisco to Santa Cruz, the latter of which is a tourist beach town/city.

An audio story about Santa Cruz may be discovered, selected and played. The story may mention different locations or points of interest (POIs) near Santa Cruz such as river, beach, boardwalk, museum, libraries, educational institutions or colleges, etc.

As these locations or POIs are mentioned in the audio story, some or all of them can be visually represented, listed, marked or highlighted—e.g., for a certain period of time such as the duration of the audio story, or a chapter therein, or a set amount of time around a corresponding mention in the story—with specific graphic icons or UI controls on a map view for navigation currently displayed or rendered on the image display or display screen built in with the vehicle.

The user can interact with or simply tap a specific location/POI or its corresponding UI icon or control on the map view to access a set of specific operations (e.g., reservation, open hours, direction, rating or ranking, ticket information, etc.) relating to the location/POI. The user can also interact with or simply tap a specific location/POI represented in the UI or map view to fast forward or backward to a specific chapter or portion of the audio story to hear about the specific location/POI. The user can further interact with or simply tap a specific location/POI or associated operation(s) represented in the UI or map view to discover, view or consume additional information or media contents and/or audio stories relating to the specific location/POI.

Discovered media contents or audio stories may be accessed, retrieved or streamed from different media content sources. Locations or POIs as mentioned in a media content or audio story may be identified in media or audio metadata—or metadata attendant to media or audio data—in a media/audio file containing the media content or audio loaded, downloaded or streamed, for example in real time, from a media content source. Example media or audio metadata used to identify locations or POIs may include, but are not necessarily limited to, names and/or geolocational coordinates and/or access information and/or hours open and/or images/visuals and/or user operable links to access additional media contents or audio stories of the locations or POIs, selections of or links to invoke operations specific to the locations or POIs, data or information supplied by the media content source or provider or creator, etc.

In some operational scenarios, location or POI information may be dynamically determined based on data or information (e.g., textual information, image information, etc.) extracted from a media content or audio story. For example, closed caption, transcript, etc., embedded in or extracted from (e.g., by applying real time or non-real time natural language processing or NLP, by applying artificial intelligence or AL techniques, by applying machine learning or ML techniques, etc.) the media content or audio story may be used to detect a location or POI mentioned in the media content or audio story. Location or POI related data or metadata such as coordinates, hours open, access information, imagery/visuals, etc., may be dynamically generated for the detected location or POI at runtime.

Additionally, optionally or alternatively, under techniques as described herein, a vehicle equipped with relatively high quality an audio system (e.g., 360 degree or 3D audio, audio system capable of producing spatial audio at pinpoint precision, etc.) and/or image display may be used as a unique venue to playback original media contents or audio stories created by content creators or providers specifically for vehicle-based media rendering environments. Hence, the vehicle may be used as a unique rendering environment for rendering or playing back media contents or audio stories.

Vehicle or hardware components in the vehicle or car such seats, wipers, door locks, air ventilators, etc., may be used as a part of media rendering such as in storytelling, for example while the vehicle is not being used for driving. By way of illustration but not limitation, an audio story may be about a sugar monster trapped in the vehicle's trunk. After releasing from the trunk, as the sugar monster walks around the car, corresponding sounds of the sugar monster may be depicted or rendered as from various locations of the sugar monster such as rear right or roof or front right, etc., through 360 degree audio generated by the vehicle's audio system. In addition, hardware components of the vehicle such as window, door lock, air ventilators, etc., may be used as a part of realtime media rendering in addition to media or audio rendering of the audio system or image display. As the sugar monster pounds the window and shouts, "open the window," the vehicle may be triggered to open the window while the air ventilator is blowing puffs of air out (e.g., toward the user, etc.) accompanying the sugar monster's heavy heaving sounds. As another example, when a movie scene—in an immersive media content being rendered in the vehicle—depicts nerve or sleeping gas is blowing toward people or audience, the air ventilator in front of the user in the vehicle may be operated synchronously to blow air to the user's face so that the user acquires or gains (e.g., delightful, etc.) immersive media consumption experience that invokes or includes different sensory experience other than sights and sounds for the user.

Hence, techniques as described herein may be implemented to integrate operations or actions of vehicle components in vehicles with audio systems and/or image displays in the vehicles for users or media consumers to obtain immersive media consumption experiences beyond audio and visual sensory experiences generated by audio systems and/or image displays. Vehicle centric or focused media contents or audio stories may be created, produced or generated by various (e.g., world class, etc.) content creators or providers specifically for vehicle-specific immersive media rendering environments.

In some operational scenarios, in addition to audio data, video data, audio metadata and/or video metadata to be used for audio only or audiovisual rendering, vehicle component (control) metadata may be included as a part of media content or media content data in a media or audio file or stream to enable a recipient system of the media content to effectuate, control and synchronize specific operations or actions of specific vehicle components with media or audio rendering operations performed with an audio system or image display.

Approaches, techniques, and mechanisms are disclosed for media rendering in vehicles. Specific user input is received through an in-vehicle user interface device built in with a vehicle while the in-vehicle user interface device is concurrently displaying a navigation map visually depicting a geographic area in connection with a current position of the vehicle. The specific user input is used to generate an audio story selection list that includes a plurality of audio story selections. The plurality of audio story selections includes one or more specific audio story selections respectively for one or more audio stories relating to one or more geographic locations within the geographic area depicted on the navigation map. Second specific user input is received through the in-vehicle user interface device. The second specific user input indicates a specific audio story selection among the one or more specific audio story selections. The specific audio story selection corresponds to a selection of a specific audio story, among the one or more audio stories, that relates to a specific geographic locations among the one or more geographic locations within the geographic area depicted on the navigation map. In response to receiving the second specific user input, the specific audio story is caused to be streamed from a specific media content source and rendered through an in-vehicle audio system built in with the vehicle.

Approaches, techniques, and mechanisms are disclosed for immersive media rendering with vehicle components. According to one embodiment, an immersive media content to be played back in a vehicle is identified. The immersive media content has been authored for rendering in a vehicle-specific media rendering environment. Audio data and vehicle component control metadata are determined in the immersive media content. The audio data is to be audibly rendered through an in-vehicle audio system built in with the vehicle. The audio data in the immersive media content is used to generate sound waves with a set of one or more audio speakers of the in-vehicle audio system. The sound waves produce an in-vehicle sound field for a user inside the vehicle to audibly perceive. The vehicle component control metadata in the immersive media content is used to perform one or more actions of one or more vehicle components of the vehicle. The one or more actions of the one or more vehicle components are synchronized by way of the vehicle component control metadata to one or more specific playback times in a playback time duration represented in the immersive media content.

In other aspects, the invention encompasses computer apparatuses and computer-readable media configured to carry out the foregoing techniques.

2.0. Structural Overview

FIG. 1A illustrates an example in-vehicle media rendering and navigation system 100, in which media discovery and playback techniques as described herein may be practiced, according to an embodiment. In some operational scenarios, the in-vehicle system 100 is implemented in part or in whole with a head unit or a media entertainment/infotainment system built-in with a vehicle. The in-vehicle system 100 may include one or more computing devices comprising any combination of hardware and software configured to implement the various logical components described herein, including a media discovery and rendering core (or subsystem) 102, a point-of-interest (POI) navigation application 104. Some or all subsystems or components of the in-vehicle system 100 are implemented using one or more computing devices or processors. The in-vehicle system 100 may also include one or more memories storing instructions for implementing various components described herein, one or more hardware or computing processors configured to execute the instructions stored in the one or more memories, and various data repositories in the one or more memories for storing data structures utilized and manipulated by various components in the in-vehicle system 100.

Figure 1B:
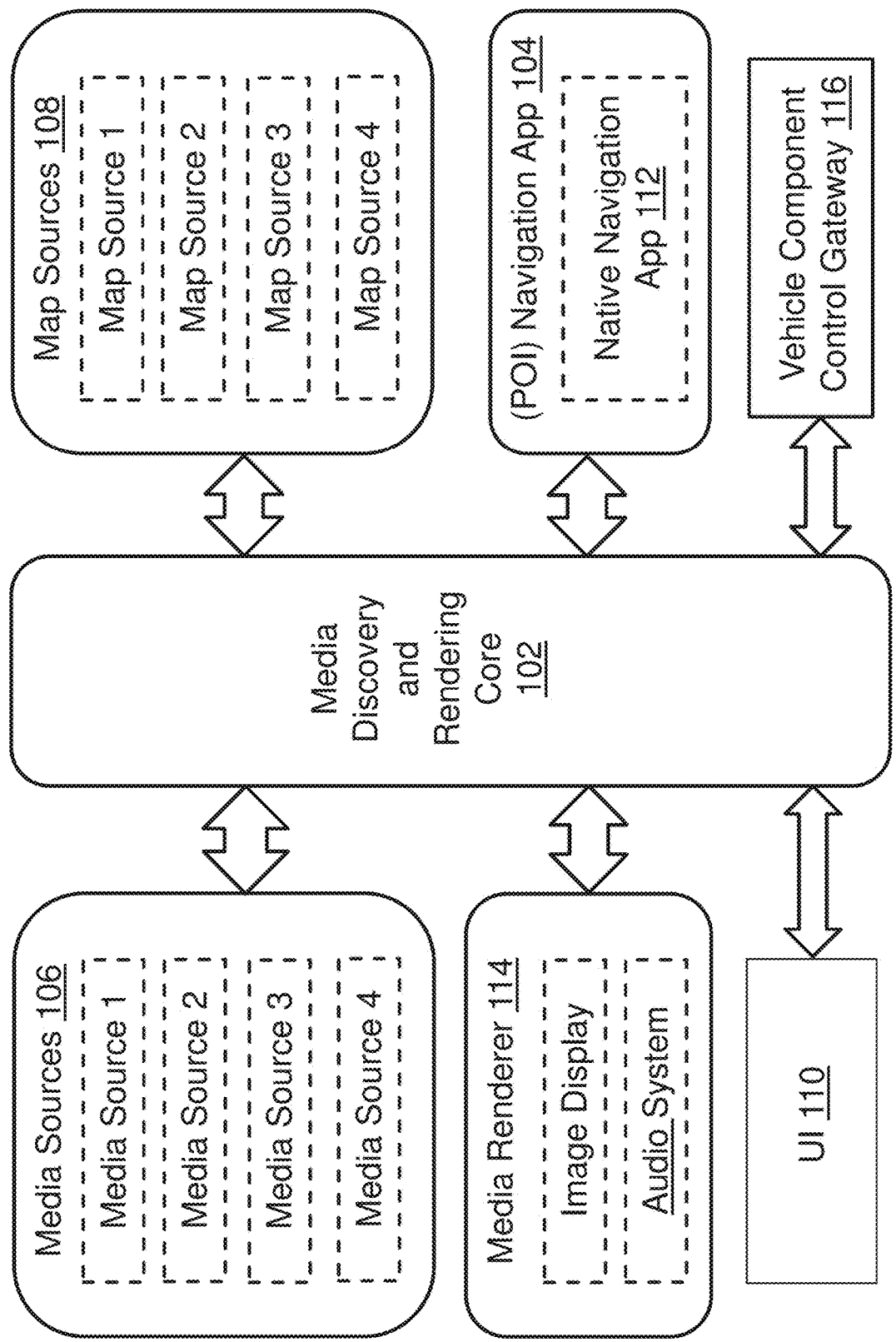

FIG. 1B illustrates a more-detailed example block diagram for systems and/or subsystems involved in in-vehicle media discovery and playback operations, according to an embodiment. Each of some or all subsystems or components in FIG. 1B may be implemented at least in part with one or more computing processors and any combination of hardware and software configured to implement control and/or perform various operations described herein. Each of some or all of the systems and/or subsystems may include one or more computer-readable memories or media storing instructions for implementing the various components or performing various operations described herein, one or more hardware or computing processors configured to execute the instructions stored in the one or more memories, and various data repositories in the one or more computer-readable memories or media for storing data structures utilized and manipulated by the various components.

2.1. Discovery and Playback Core

The media discovery and rendering core (or subsystem) 102 may operate or interact with one or more media content sources 106, through one or more media content source application programming interfaces (APIs), to discover and access media contents including but not limited audio contents (e.g., audio stories, etc.) that may be selected, presented, rendered or played back to a user 110 of the vehicle. The media content source APIs may be implemented by the media content sources 106 and/or the system 100 or the media discovery and rendering core 104 therein.

Figure 1C:
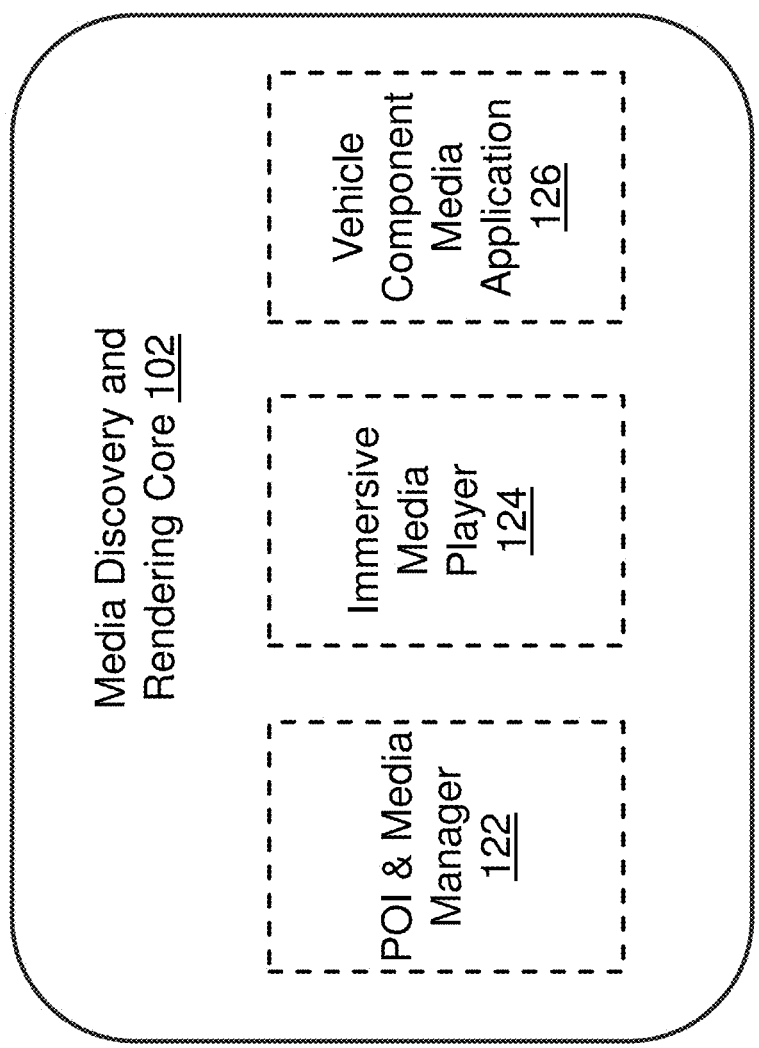
FIG. 1C illustrates an example location-based media discovery and rendering core or subsystem.

As illustrated in FIG. 1C, the media discovery and rendering core 102 may include a POI & media manager 122, an immersive media player 124, a vehicle component media application 126, etc.

The media discovery and rendering core 102, or the POI & Media manager 122 therein, may operate or interact with one or more map (or navigation) data sources 108, through one or more map data source application programming interfaces (APIs), to access, process and/or annotate map or navigation data. The map data source APIs (or endpoints) may be implemented by the map data sources 108 and/or the system 100 or the media discovery and rendering core 104 therein. Some or all of the map or navigation data may be used by the media discovery and rendering core 102 to discover, access, or retrieve location specific or map specific media contents from the media content sources 106.

The media discovery and rendering core 102, or the POI & Media manager 122 therein, may annotate, modify, or enrich the map or navigation data as accessed or retrieved from the map data sources 108, for example, to indicate specific geographic locations or places of interest corresponding to some or all of the media contents as accessed or retrieved from the media content sources 106.

The access or retrieval of the media contents, the access or retrieval of the map or navigation data, and/or the annotation, modification or enrichment of the map or navigation data may be performed by the system 100 or the media discovery and rendering core 102 or the POI & Media manager 122 on an ongoing basis in real time, based at least in part on some or all of: the current location (also referred to as current car location or CCP) of the vehicle, the current specified route of the vehicle, the current specified destination, etc.

2.2. Media Content Sources

The media content sources 106 may interact with the media discovery and rendering core 102 or the POI & Media manager 122 therein using media source APIs or endpoints. These media source APIs or endpoints may be provided or implemented by the media content sources 106 and/or the media discovery and rendering core 102 for the purpose of accessing, retrieving or exchanging media content data and/or media content metadata.

As illustrated in FIG. 1B, the media (content) sources 106 may include one or more media sources (e.g., media source 1 through 4, etc.), each of which may implement its own sets of media source APIs or endpoints for the media discovery and rendering core 102 to access or retrieve media-source-specific media content data and/or metadata.

Example media contents as described herein may include, but are not necessarily limited to only, audio contents such as audio stories or audio story contents. Example media (content) metadata as described herein may include auxiliary media data such as audio story details in text, location (e.g., latitude, longitude, etc.) of a point of interest to which a media content or audio story is associated, a link or resource locator (e.g., universal resource locator or URL, etc.) for accessing the media content or audio story, links or resource locators (e.g., URLs, etc.) for accessing attendant media content asset(s) such as image(s) attendant to the media content or audio story, tour data for the point of interest, etc.

In some operational scenarios, the system 100 and/or a user 110 of FIG. 1A (e.g., the driver, passenger, etc.) may limit the scope of the media discovery and playback operations to specific type(s) of media contents. As an example, the system 100 and/or the user 110 may limit the scope to audio contents only with stationary images and with no or little dynamic video content, while the vehicle is in motion.

In some operational scenarios, the system 100 and/or the user 110 may limit the scope of the media discovery and playback operations to media contents relating to or associated with points of interest in specific geographic area(s) such as the current location of the vehicle as indicated by geolocational coordinate of the vehicle, intended/specified destination of a trip (e.g., the current trip, etc.), a user-specified location or area, selected/specified route of a trip (e.g., the current trip, etc.), etc. As an example, the system 100 and/or the user may limit the scope to media contents relating to or associated with points of interest in a specific geographic area around the current location of the vehicle by default, by previous user and/or system configuration, or by the current user and/or system configuration. The specific geographic area may be identified using one or more distance thresholds or criteria.

A media content such as an audio story in connection with or mentioning a specific place of interest (POI) may be referred to as a POI media content or a POI audio story.

It should be noted that, in addition to or in place of POI media contents or audio stories, non-POI media contents or audio stories—which may or may not contain mentions of geographic locations or points of interest near the user 110 or the user's destination or route/trip—may be searched, discovered, played, rendered, or otherwise consumed by the user 110 using or interacting with the system 100.

2.3. Map Sources

The map data sources 108 may interact with the media discovery and rendering core 102 or the POI & Media manager 122 therein using map source APIs or endpoints. These map source APIs or endpoints may be provided or implemented by the map data sources 108 and/or the media discovery and rendering core 102 and/or the POI & Media manager 122 for the purpose of accessing, retrieving or exchanging map data or data attendant to the map data.

As illustrated in FIG. 1B, the map (data) sources 108 may include one or more map (data) sources (e.g., media source 1 through 4, etc.), each of which may implement its own sets of map source APIs or endpoints for the media discovery and rendering core 102 to access or retrieve map-source-specific map data. Example map sources as described herein may include, but are not necessarily limited to only, MapBox, TomTom, HereMaps, Apple, etc.

Example map data or data attendant to the map data as described herein may include, but are not necessarily limited to only, map view rendering data, map marker data, map style data, route provider data (e.g., route provider identifier, etc.), map related, POI related or POI media related search provider data (e.g., search provider identifier, etc.), data for map overlays or superimpositions (e.g., with the currently displayed map view, etc.), map gesture data (e.g., data used to tilt map views, user interaction data, etc.), location data provider (e.g., POI data provider, etc.), and so on.

2.4. POI Navigation Application

The map or navigation data and information relating to the media contents accessed or retrieved by the media discovery and rendering core 102 may be provided by the media discovery and rendering core 102 or the POI & Media manager 122 therein to the navigation application 104 through one or more navigation APIs. The map/navigation data and/the information relating to the media contents can be used by the POI navigation application to perform vehicle navigation operations, to mark or highlight POIs, to present selections of the media contents for playback or rendering and/or to enable or support map-based user interactions. The navigation APIs (or endpoints) may be implemented by the media discovery and rendering core 102 and/or the (POI) navigation application 104.

In some operational scenarios, the (POI) navigation application 104 may include or implement a native navigation application—or operate in a native navigation operational mode—as illustrated in FIG. 1B for performing core navigation operations with no or little POI based media discovery or playback operations. The (POI) navigation application 104 may operate in either a POI mode or the native navigation mode based on user and/or system configuration applicable and/or dynamically reconfigurable at runtime.

In the native navigation mode, only the native navigation operations may be enabled; POI media content discovery and playback may be disabled or otherwise unavailable.

In the POI mode, both the native navigation operations and the POI media content discovery and playback are enabled or available. User interaction data may be generated to specify whether the user intends the navigation operation to operate in the native navigation mode or in the POI mode. In response to determining that the user interaction data specifies a user intent of operating in the POI mode, the (POI) navigation application 104 switches to operate or enables the POI mode.

2.5. User Interface and Media Rendering

The system 100 may interact with the user 110 via a user interface implemented—e.g., by an immersive media player 124 in the media discovery and rendering core 102 and/or the navigation application 104, etc.—using an image display and/or an audio system in a media renderer 114 of FIG. 1B.

Some or all of the map or navigation data—as (e.g., dynamically, in real time, etc.) modified, enriched or enhanced—may be visually rendered as a part of the user interface on the image display along with any other map or navigation related data such as real time navigational cues/suggestions/directions, trip information, etc. Additionally, optionally or alternatively, map or navigational related data may be audibly rendered as a part of the user interface through the audio system. One or both of the image display and the audio system used by the navigation application 104 may be built-in with the vehicle.

The user interface may also be used by the immersive media player 124 in the media discovery and rendering core 102 and/or the POI navigation application 104 to interact with the user 110 to obtain or generate user interaction data in connection with media discovery and playback and/or navigation. For example, the user interaction data may include or specify media content search options selected by the user 110, particular media content sources selected by the user 110, particular media contents selected by the user 110 for rendering or playing back, or the like. The user interface data may be obtained or generated through the user interface through haptic touch operations, key entry operations, voice activated operations, national language processing implemented with machine learning, etc.

The media renderer 114 of FIG. 1B may operate or interact with the immersive media player 124 and implement a set of media framework APIs, which may include—but are not necessarily limited to only—media control APIs, audio streaming APIs, video/image streaming APIs, etc. The media control APIs may be used by the media discovery and rendering core 102 and/or the POI navigation application 104 to control operations, operational states and/or operational modes of the image display and/or the audio system built in with the vehicle. The audio streaming APIs may be used by the immersive media player 124 in the media discovery and rendering core 102 to stream audio data and metadata—e.g., a POI media content or audio story, etc.—to the audio system built in with the vehicle for rendering or sound production/reproduction purposes.

In some operational scenarios, the audio data may include object based audio representing different audio/sound sources (e.g., characters, objects, cars, music instruments, etc.) to be depicted in a (e.g., spatially distributed, three-dimensional, etc.) sound field rendered by the audio system, whereas the audio metadata may specify positional and motion parameters of the represented/rendered audio/sound sources in the sound field.

The video/image streaming APIs may be used by the immersive media player 124 in the media discovery and rendering core 102 to stream image/video data and metadata—e.g., image(s) relating to the POI media content or audio story, etc.—to the image display (or image codecs operating in conjunction therewith) built in with the vehicle for rending or displaying.

In some operational scenarios, the image(s) relating to the POI media content or audio story may be displayed or rendered concurrently with the currently displayed map view for navigation on the image display, for example, in different regions/portions of the overall image display.

2.6. Vehicle Components and Gateway

The system 100, or the media discovery and rendering core 102 and/or the navigation application 104 therein, may control—or obtain operational states of—vehicle components (e.g., wiper control, lighting control, seat control, HVAC, etc.) used in the media discovery and playback operations via a vehicle component control gateway 116 of FIG. 1B. The vehicle component control gateway 116 may communicate with a vehicle component media application 126 or a vehicle component controller 132 of FIG. 1D in the media discovery and rendering core 102 on one side and communicate with controllers or microcontrollers of the vehicle components via data in-vehicle communication links or paths such as ethernet, controller area network(s) or CAN(s), MQTT, etc., using applicable in-vehicle data communication protocols and/or APIs (e.g., in a shared library, based on messages such as markup language messages, etc.) on the other side.

Figure 1D:
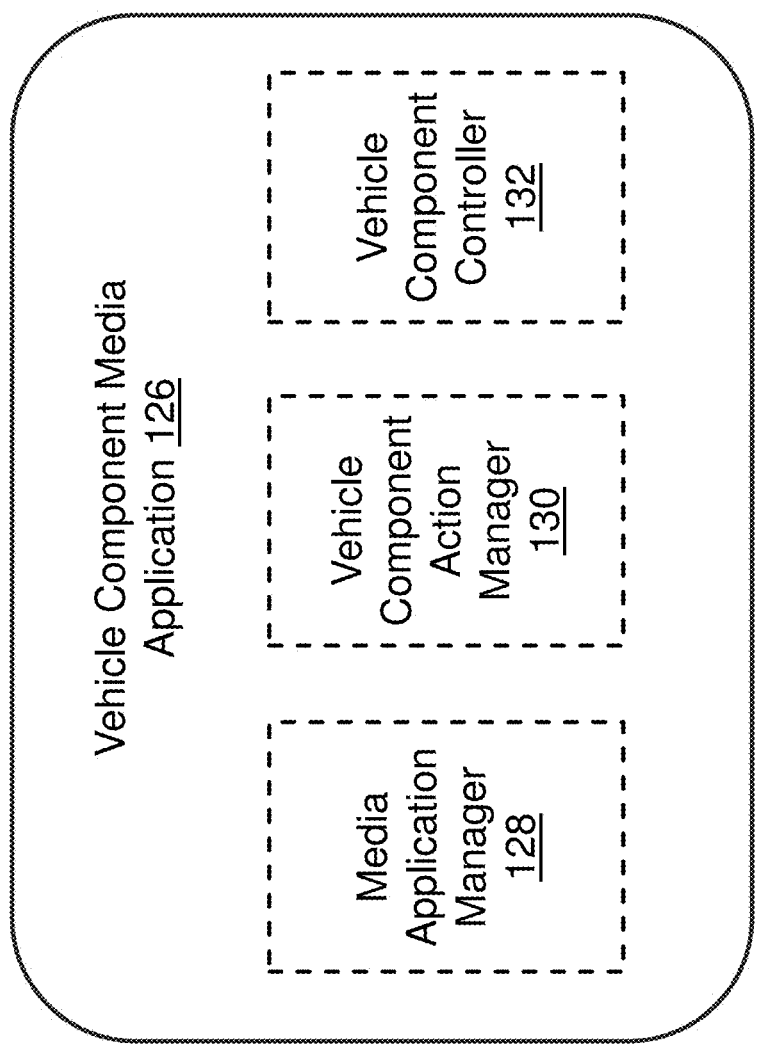
FIG. 1D illustrates an example vehicle component media application.
Figure 1E:
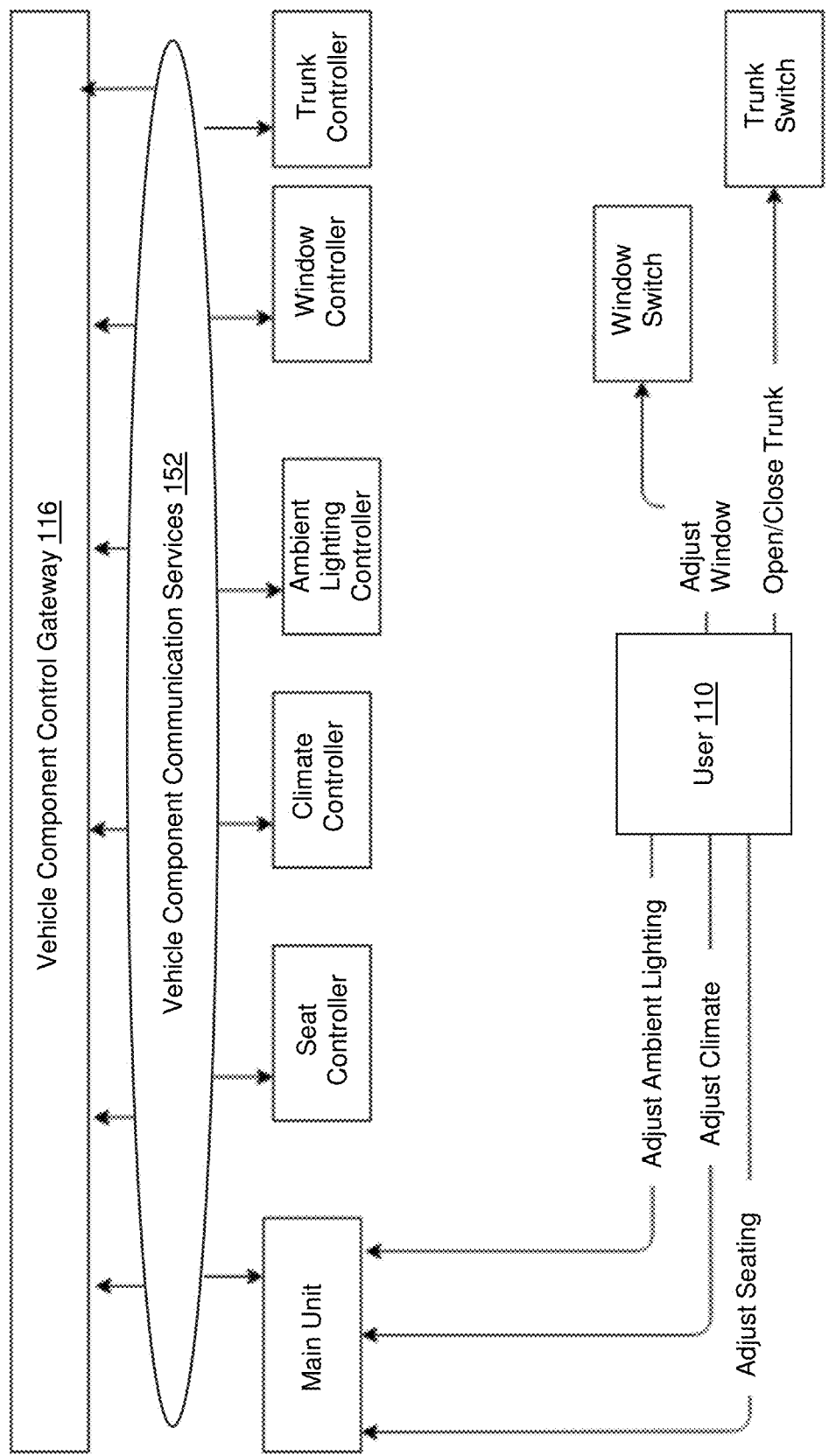
FIG. 1E illustrates an example vehicle component control gateway operatively linked with vehicle components.

In some operational scenarios, the vehicle component control gateway 116 of FIG. 1E may communicate with relatively low level (e.g., hardware, firmware, embedded system, etc.) controllers or microcontrollers of the vehicle components using one or more vehicle component communication services/networks 152 including but not necessarily limited to only a CAN bus (also referred to as "KCAN"). Commands, requests and/or responses may be exchanged between the vehicle control gateway 116 and each of the vehicle components for the purpose of obtaining states of, and performing operations with, the vehicle components such as illustrated in FIG. 1D. The vehicle components may include, but are not necessarily limited to only, a main unit operated by a user 110 (e.g., the driver, a passenger, etc.) to adjust ambient lighting, climate and seating; a seat controller, a climate controller, an ambient lighting controller, a window controller, a trunk controller, etc. As illustrated in FIG. 1E, in addition to using the main unit to control ambient lighting, climate and seating, the user 110 may also use window switch(es), a trunk switch, etc., to perform operations related to vehicle window(s), a vehicle trunk, etc. The vehicle component control gateway 116 may disable the user 110 from performing some or all operations using the main unit, window switch, trunk switch, etc. The vehicle component control gateway 116 may communicate or operate in conjunction with some or all of the controllers for the vehicle components from performing some or all operations using these vehicle components.

2.7. Miscellaneous

The system 100 illustrates only one of many possible arrangements of components configured to provide the functionality described herein. Other arrangements may include fewer, additional, or different components, and the division of work between the components may vary depending on the arrangement.

3.0. Functional Overview

In an embodiment, some or all techniques and/or methods described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

3.1. Integrated UI Operations

FIG. 2A through FIG. 2J illustrate example display pages for the POI navigation application that supports media discovery and playback operations. Some or all of these display pages may present or display map views and other UI or graphic components that support navigation as well as the media discovery and playback operations.

Figure 2A:
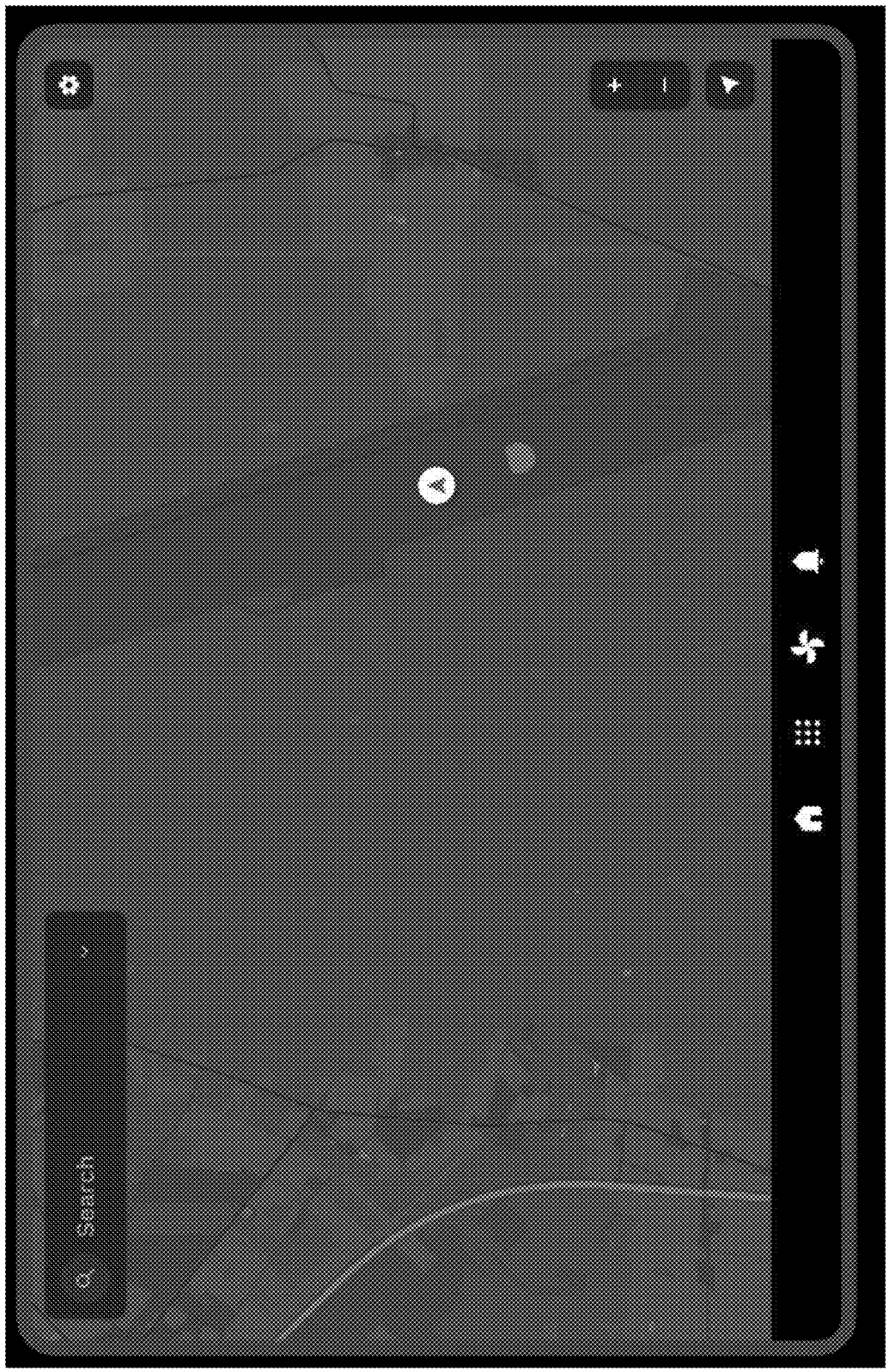
FIG. 2A through FIG. 2J illustrate example display pages for a POI navigation application that supports media discovery and playback operations.

As illustrated in FIG. 2A, a UI control such as with a "Search" label may be rendered and implemented with a display page that shows a map view. For the purpose of illustration only, a geographic area surrounding the user's or vehicle's current location as marked by a navigation icon in a white circle is displayed in the map view.

Figure 2B:
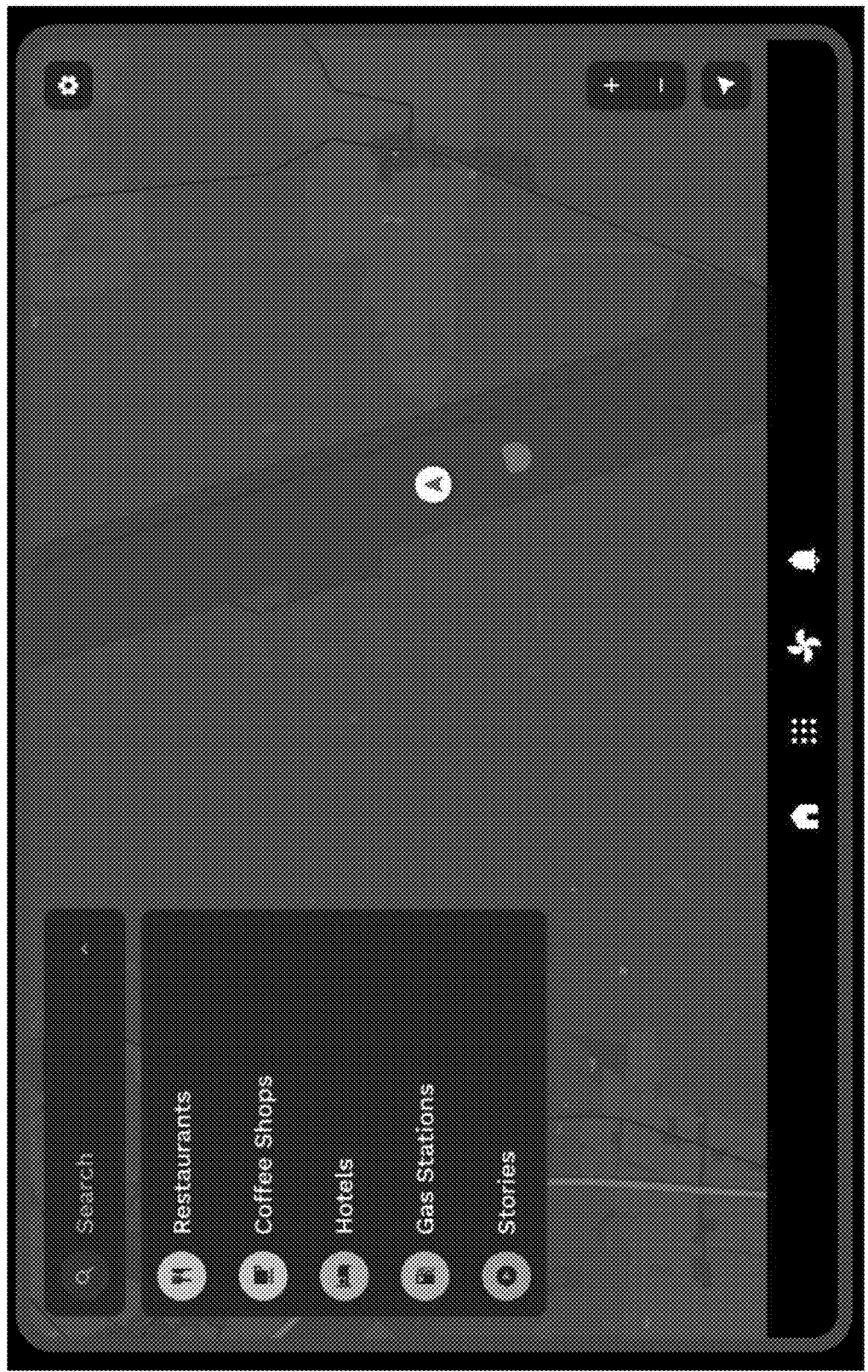

As illustrated in FIG. 2B, the UI control may be operated or interacted with the user to cause a list of options to be shown. A specific option in the list of options of FIG. 2B may be specifically identified or labeled, for example as "Stories". This specific option may be operated or interacted with the user to access or play back media contents or audio stories with the immersive media player 124 of FIG. 1C and/or the media renderer 114 of FIG. 1B built in with the vehicle.

Figure 2C:
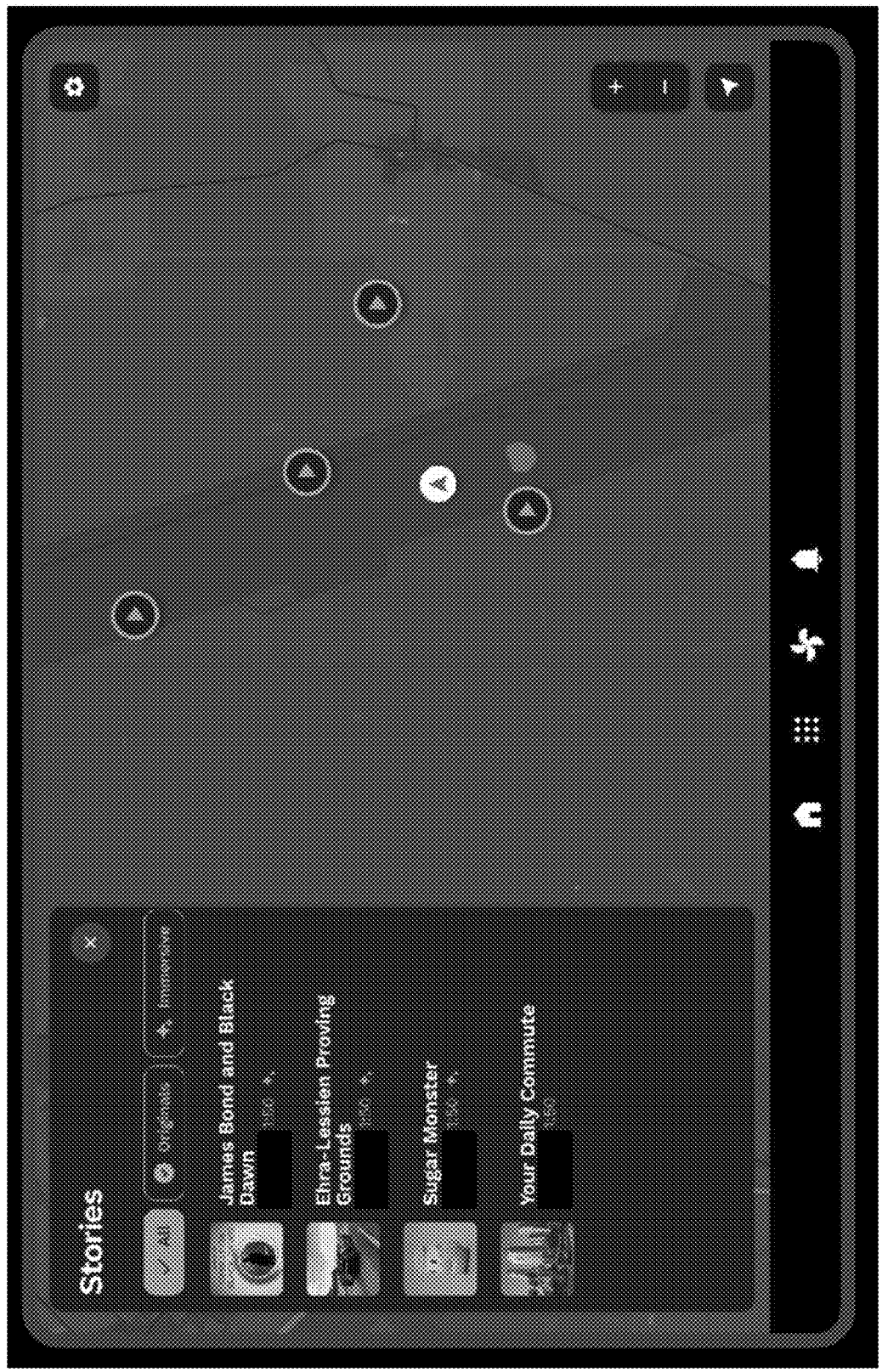

As illustrated in FIG. 2C, the media contents or audio stories may represent POI media contents or audio stories—as discovered by the media discovery and rendering core 102 of FIG. 1A, FIG. 1B or FIG. 1C or the POI & media manager 122 therein operating in conjunction with other systems/modules—corresponding to locations or POIs rendered in the map view and may be represented by graphic components such as (e.g., thumbnail, etc.) images. These graphic components may also be UI controls with which the user can interact to select a specific media content or audio story from among all the media contents or audio stories.

In a first example, the user selects a specific POI media content or audio story "James Bond Operation Black Down" among the media contents or audio stories selectable in the display page of FIG. 2C.

Figure 2D:
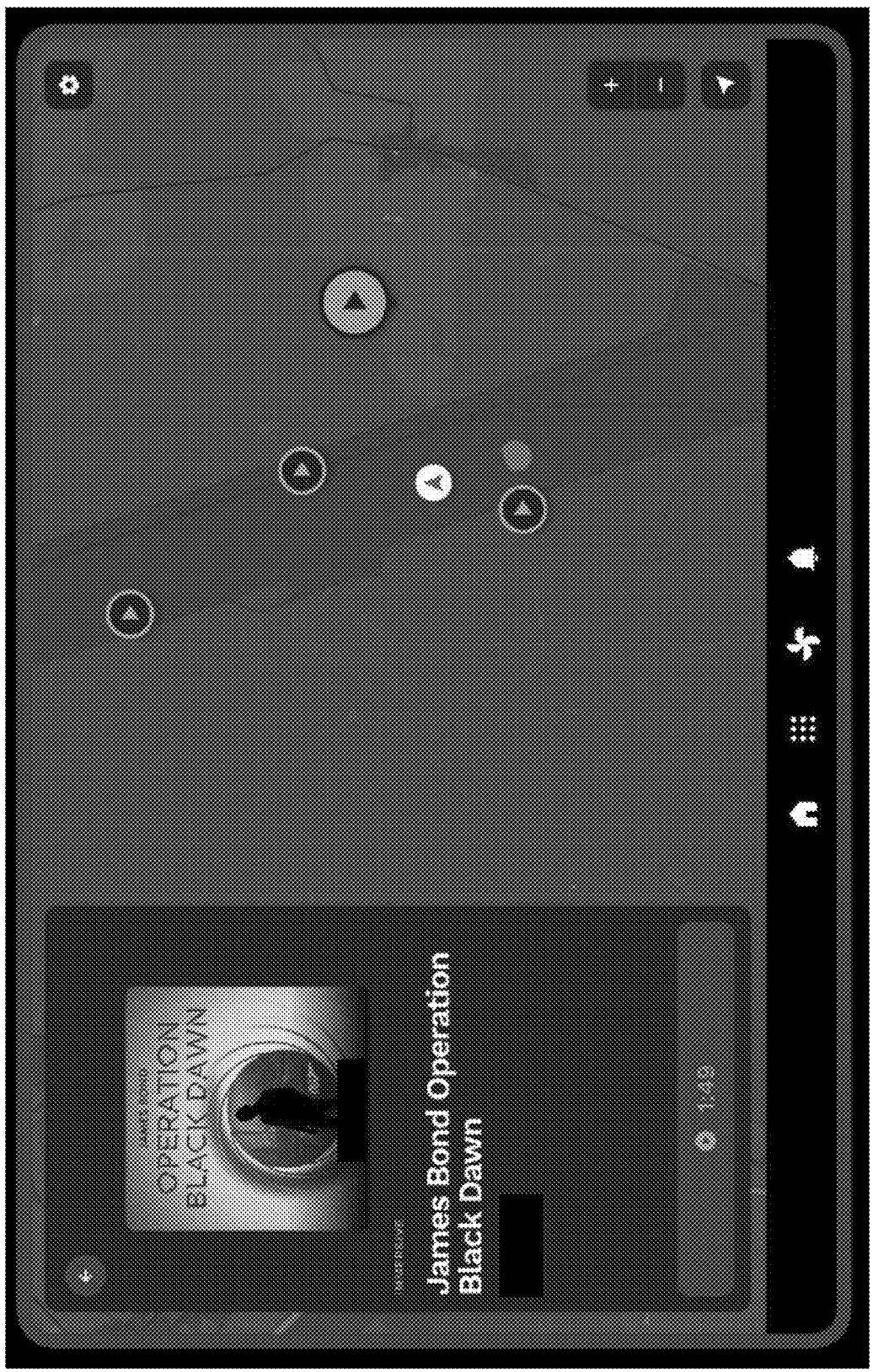

As illustrate din FIG. 2D, a new display page is shown in which a left-hand side display page portion displays more information about the currently selected POI media content or audio story such as a media content or audio story source, the length of the media content or audio story, an indication whether it is immersive (e.g., using spatial or 3D audio rendering capabilities of the audio system built in with the vehicle, etc.), or the like. In addition, a specific location or POI (e.g., a related venue, a movie theater, a theme park, etc.) corresponding to the currently selected POI media content or audio story is concurrently and specifically marked in the map view, for example as a right arrow in a solid (e.g., gray, white, etc.) circle.

In a second example, the user selects a specific POI media content or audio story "Your Daily Commute" among the media contents or audio stories selectable in the display page of FIG. 2C.

Figure 2E:
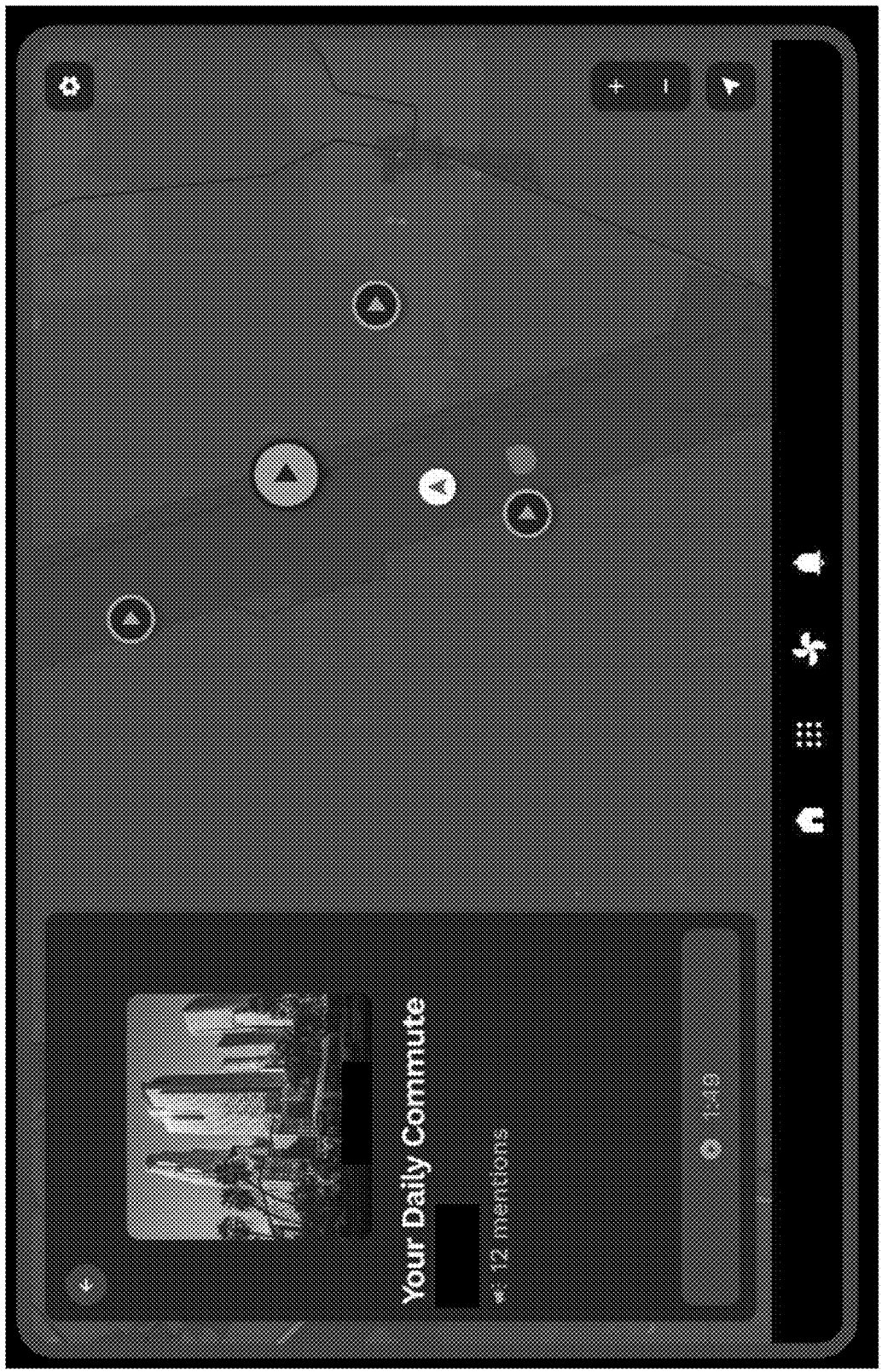

As illustrate din FIG. 2E, a second new display page is shown in which a left-hand side display page portion displays more information about the currently selected POI media content or audio story such as a media content or audio story source, the length of the media content or audio story, an indication whether it is immersive (e.g., using spatial or 3D audio rendering capabilities of the audio system built in with the vehicle, etc.), an indication of how many mentions are in the currently selected media content or audio story, or the like. In addition, a specific location or POI (e.g., a route on which the user or vehicle is traveling, etc.) corresponding to the currently selected POI media content or audio story is concurrently and specifically marked in the map view, for example as a right arrow in a solid (e.g., gray, white, etc.) circle.

Figure 2F:
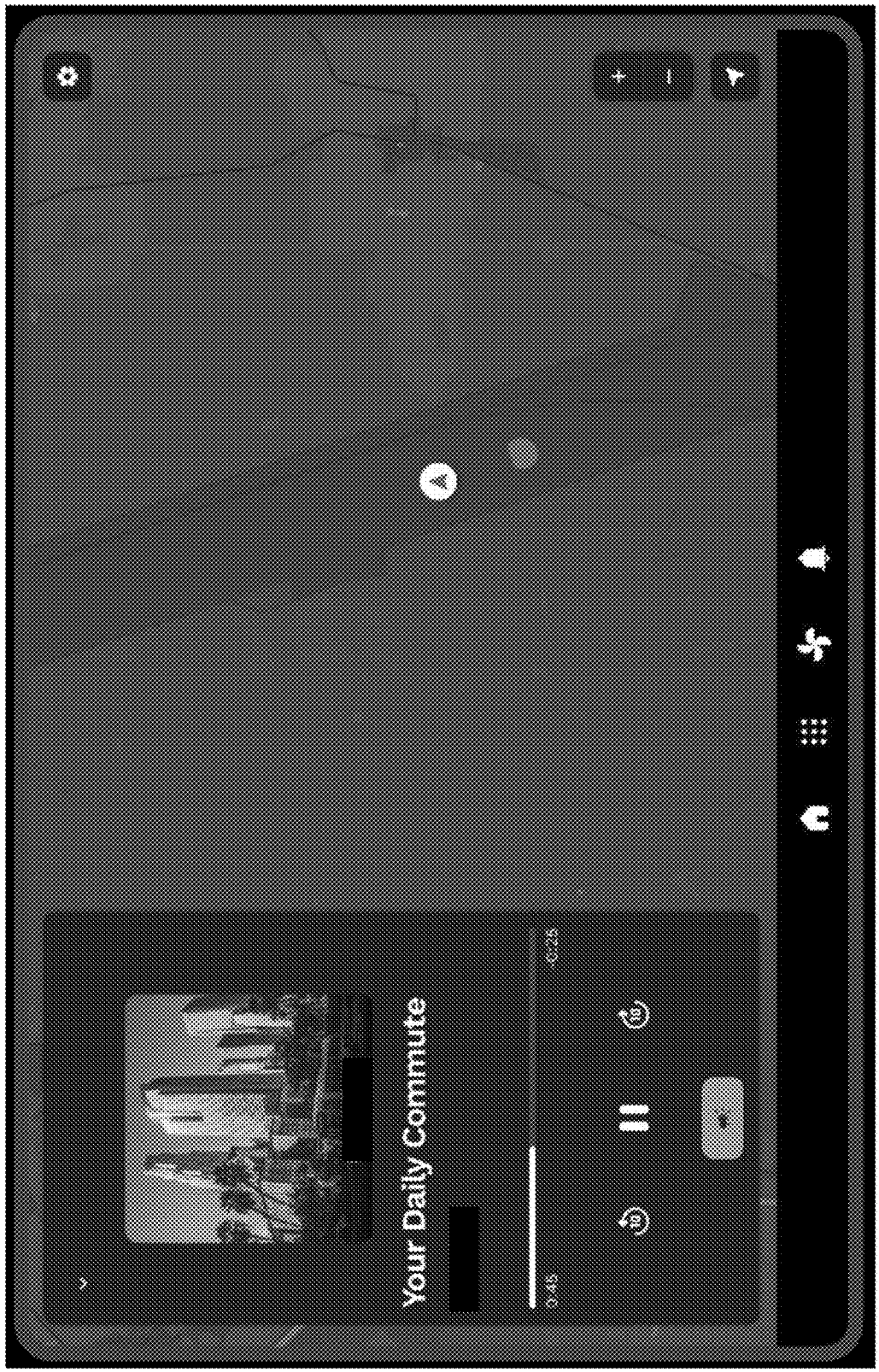

As illustrated in FIG. 2F, in response to determining that the user selects a specific media content or audio story for playback by way of either FIG. 2C or FIG. 2E, a new display page may be displayed or rendered on the image display. For the purpose of illustration only, a left-hand side portion in the new display page includes a UI control or icon for listing all the mentions in the currently played media content or audio story at the bottom. This UI control may be used by or interact with the user to indicate a user intent to list or view all the mentions. Graphic components indicating the locations or POIs to which the POI media contents or audio stories may be removed or not displayed in the map view.

Figure 2G:
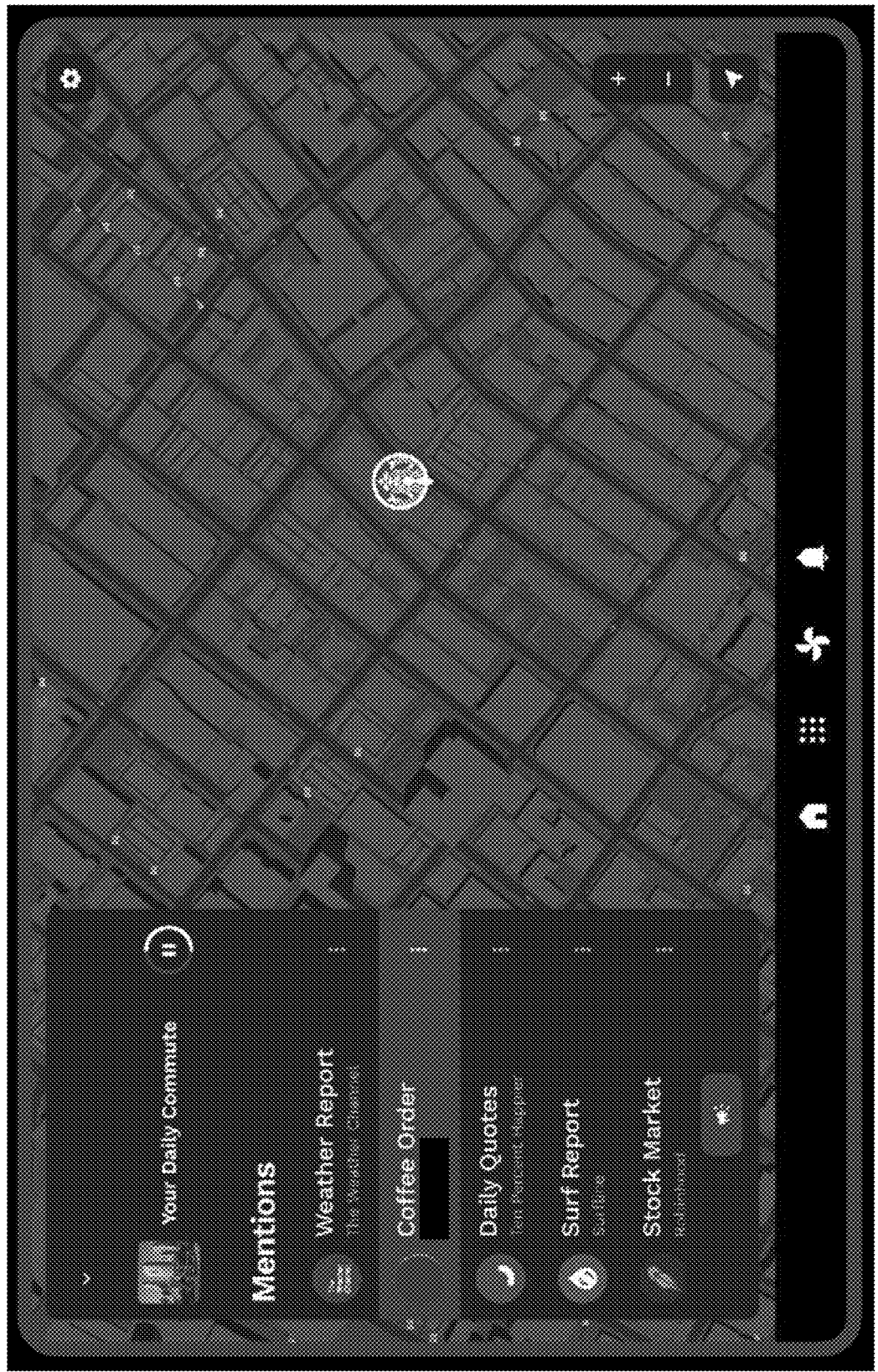

As illustrated in FIG. 2G, in response to determining that the user intends to list or view all the mentions in the currently selected or played media content or audio story, a new display page may be displayed or rendered on the image display. For the purpose of illustration only, a left-hand side portion in the new display page includes UI controls or labels for accessing all the mentions in the currently selected or played media content or audio story. Each UI control or label among the listed UI controls or labels corresponds to a respective mention in the mentions and may be scrolled to or highlighted by the user. A subset of all the mentions in the currently selected or played media content or audio story may correspond to locations or POIs in the present map view. As shown in FIG. 2G, the currently highlighted (or scrolled to) UI control or label may correspond to a specific (mentioned) location or POI in the present map view. The UI control or label may be operated by or interacted with the user to access or perform an operation in a set of operations specific to the mentioned location or POI.

Figure 2H:
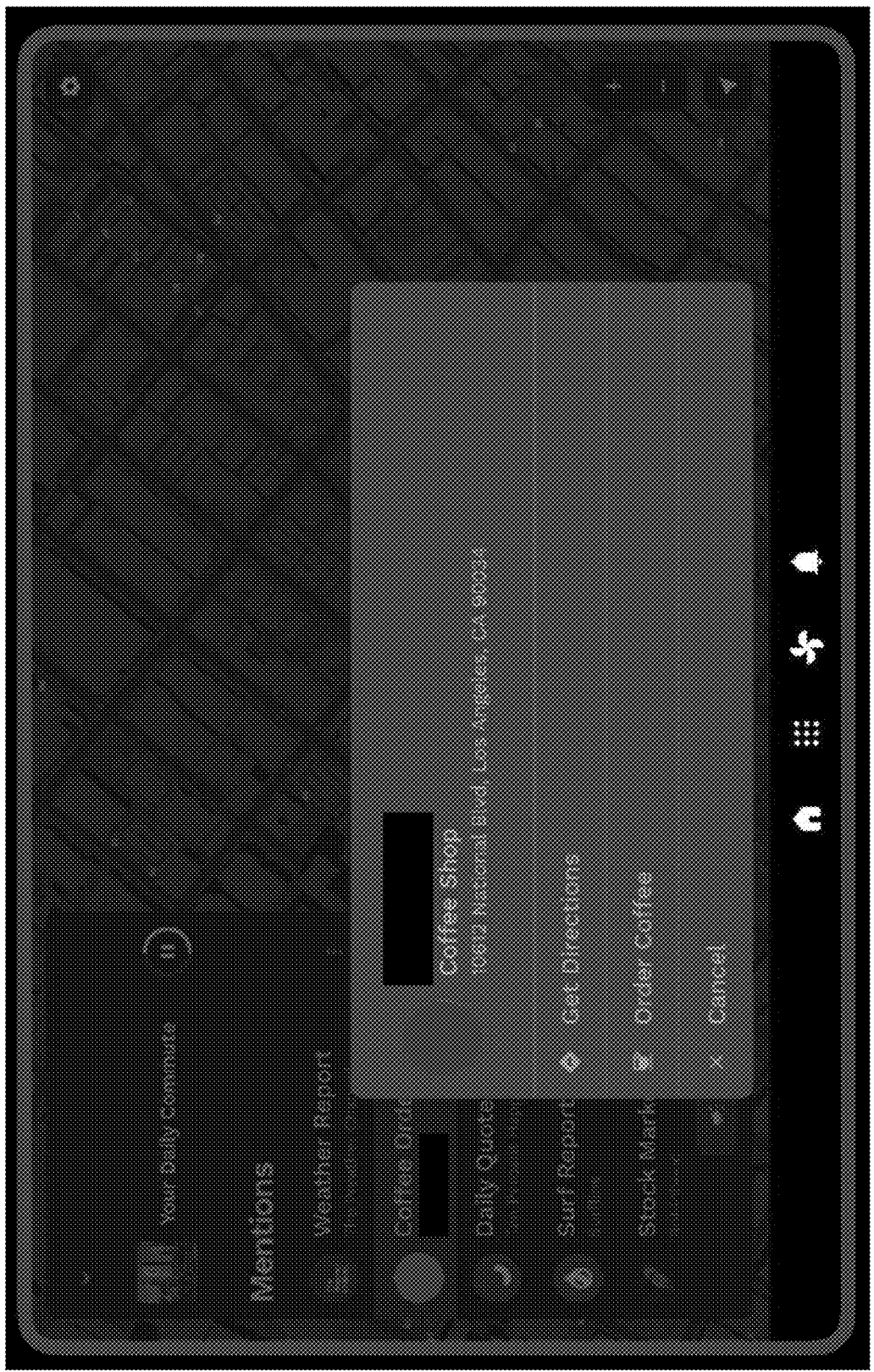

As illustrated in FIG. 2H, in response to determining that the user selects the highlighted mention that corresponding the specific mentioned location or POI in the present map view, a GUI construct such as a popup menu presenting a listing the set of operations specific to the mentioned location or POI may be displayed or rendered on the image display. The user may select or operate with any operation represented in the listing of the popup menu.

Figure 2I:
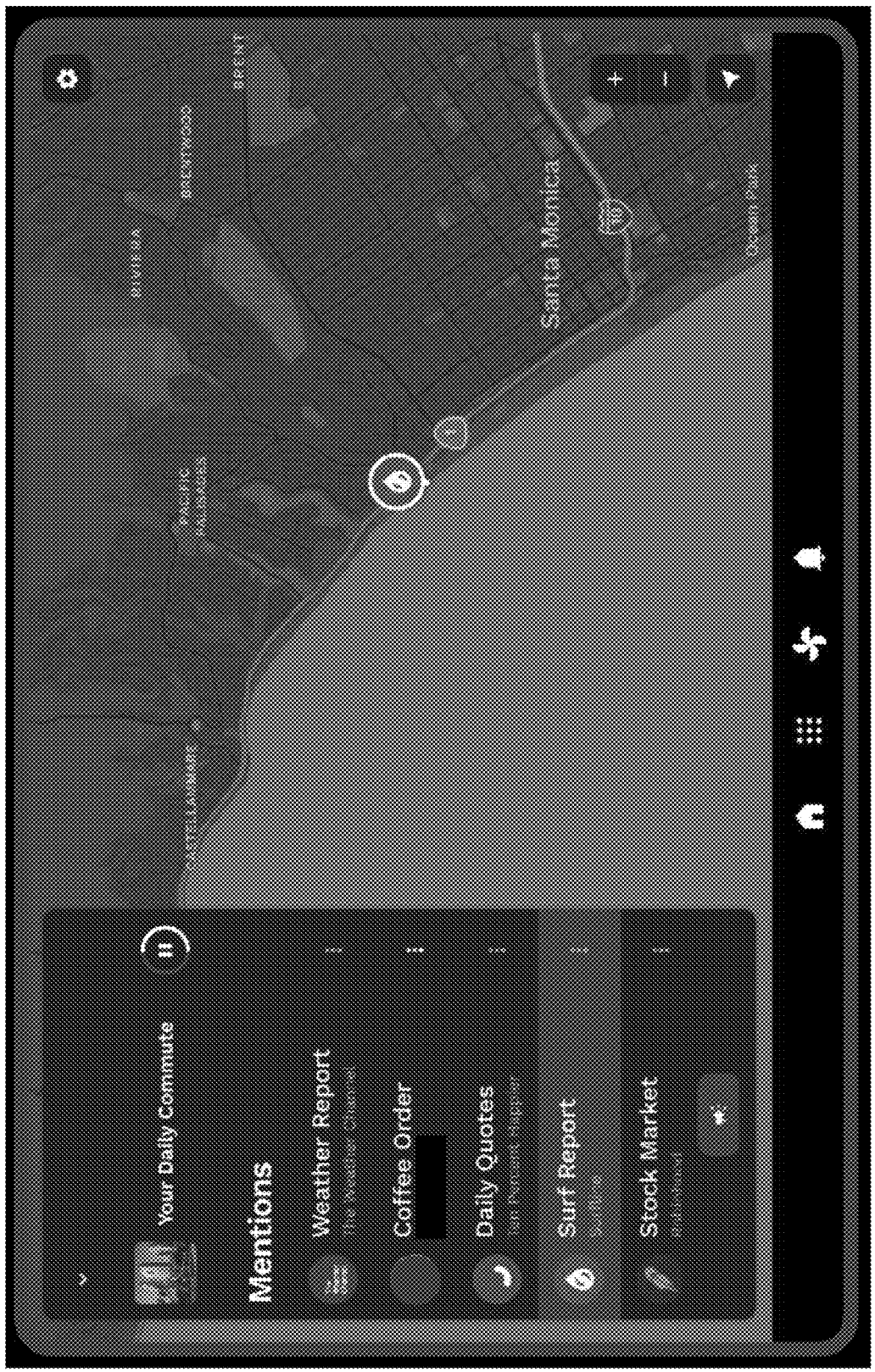

As illustrated in FIG. 2I, he user may scroll to or highlight—e.g., by way of the display page of FIG. 2G, etc.—a different highlighted mention represented by a different UI control or label. This different highlighted mention may correspond to a different location or POI specifically marked in the present map view. The different UI control or label may be operated by or interacted with the user to access or perform an operation in a different set of operations specific to the different mentioned location or POI.

Figure 2J:
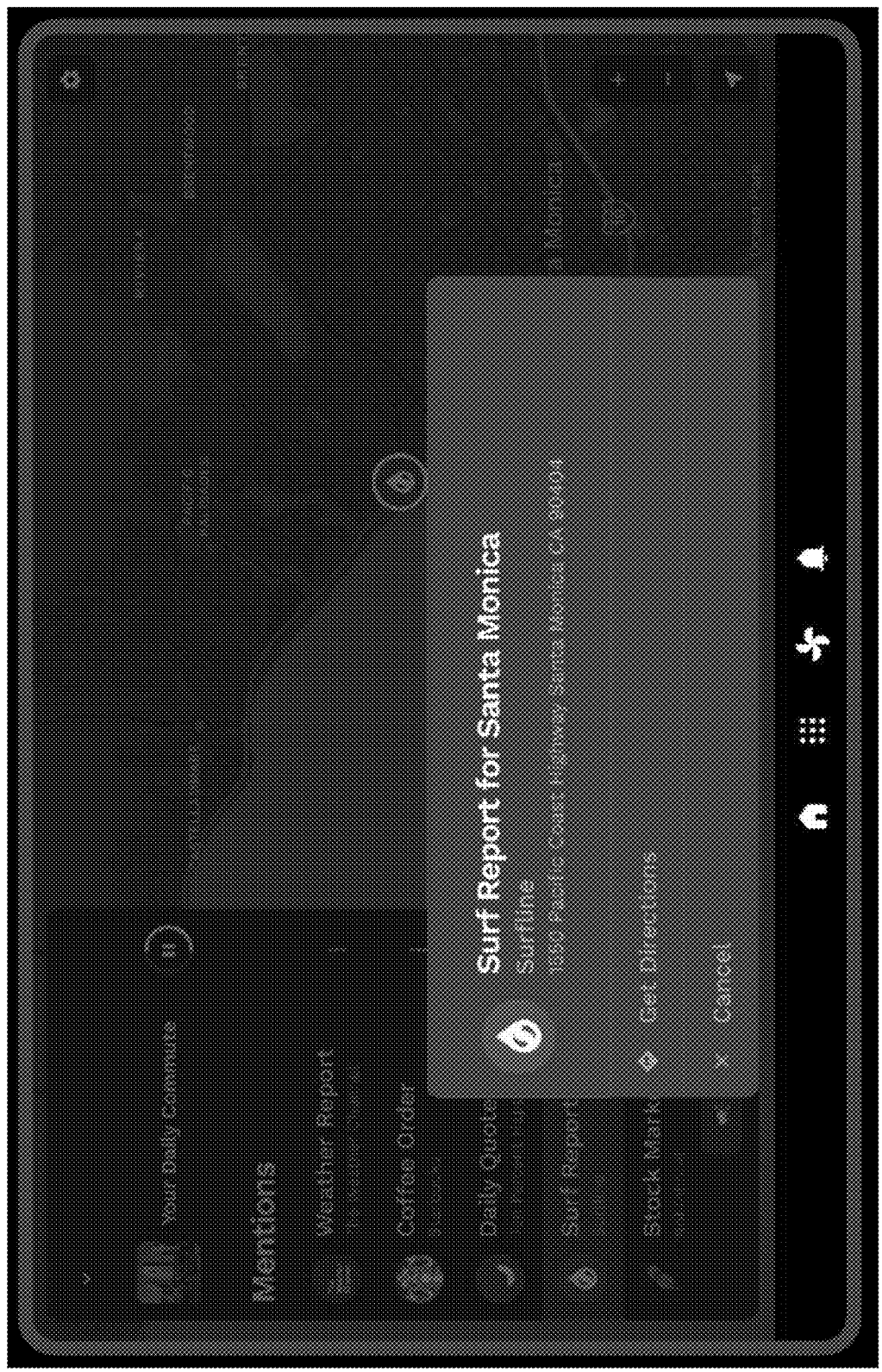

As illustrated in FIG. 2J, in response to determining that the user selects the different highlighted mention that corresponding the different mentioned location or POI in the present map view, a second different GUI construct such as a popup menu presenting a second listing the different set of operations specific to the different mentioned location or POI may be displayed or rendered on the image display. The user may select or operate with any operation represented in the second listing of the popup menu.

3.2. Concurrent UI Operations

FIG. 3A through FIG. 3J illustrate additional example display pages for the POI navigation application that supports media discovery and playback operations. Some or all of these display pages may include two concurrently rendered display page portions. The first display page portion is used to support media discovery and playback operations, whereas the second display page portion is for map views that support navigation as well as the media discovery and playback operations.

Figure 3A:
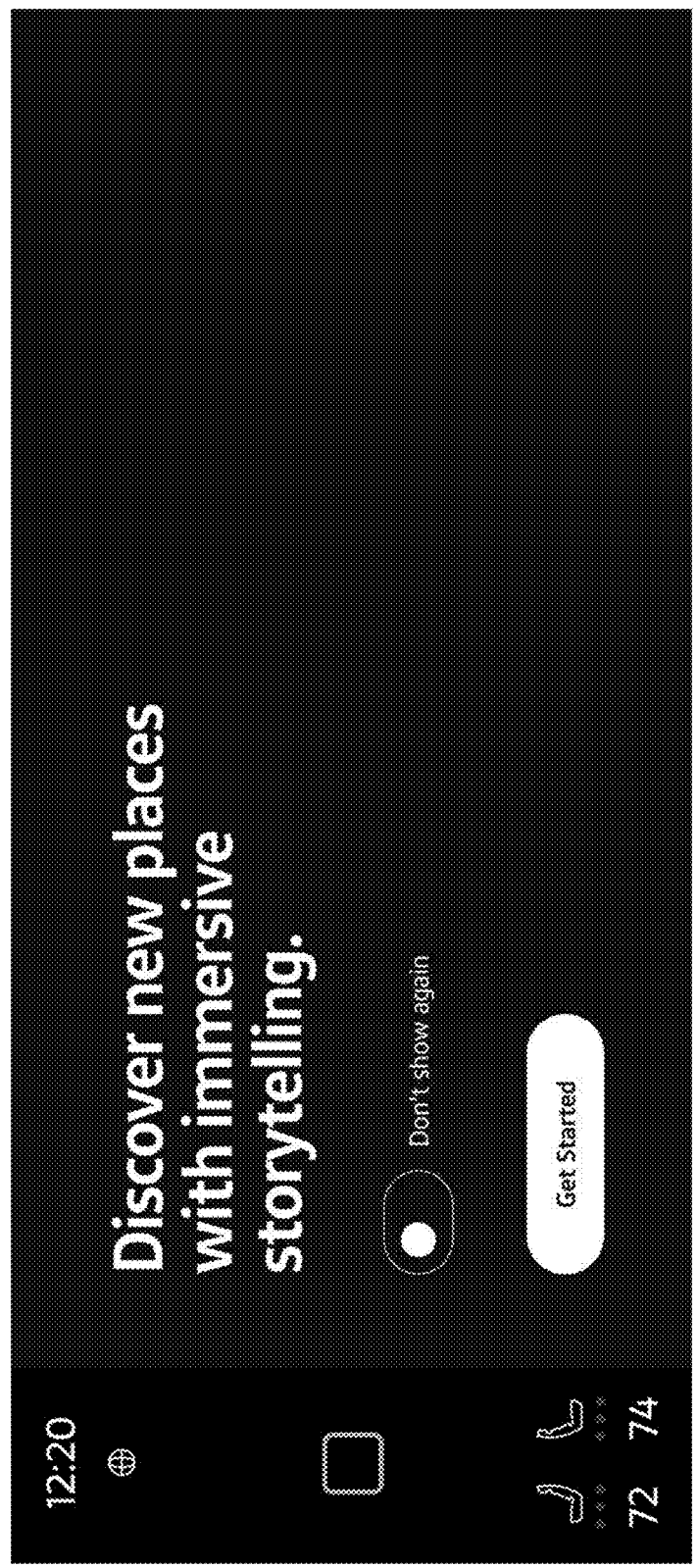
FIG. 3A through FIG. 3J illustrate additional example display pages for a POI navigation application that supports media discovery and playback operations.

The display page of FIG. 3A informs the user about the POI navigation application's purpose and provides UI controls for the user to launch the application. The UI control "Don't show again" may be selected by the user to hide this display page or screen in the future. The UI control or button "Get Started" may be selected by the user to go to the next display page or screen.

Figure 3B:
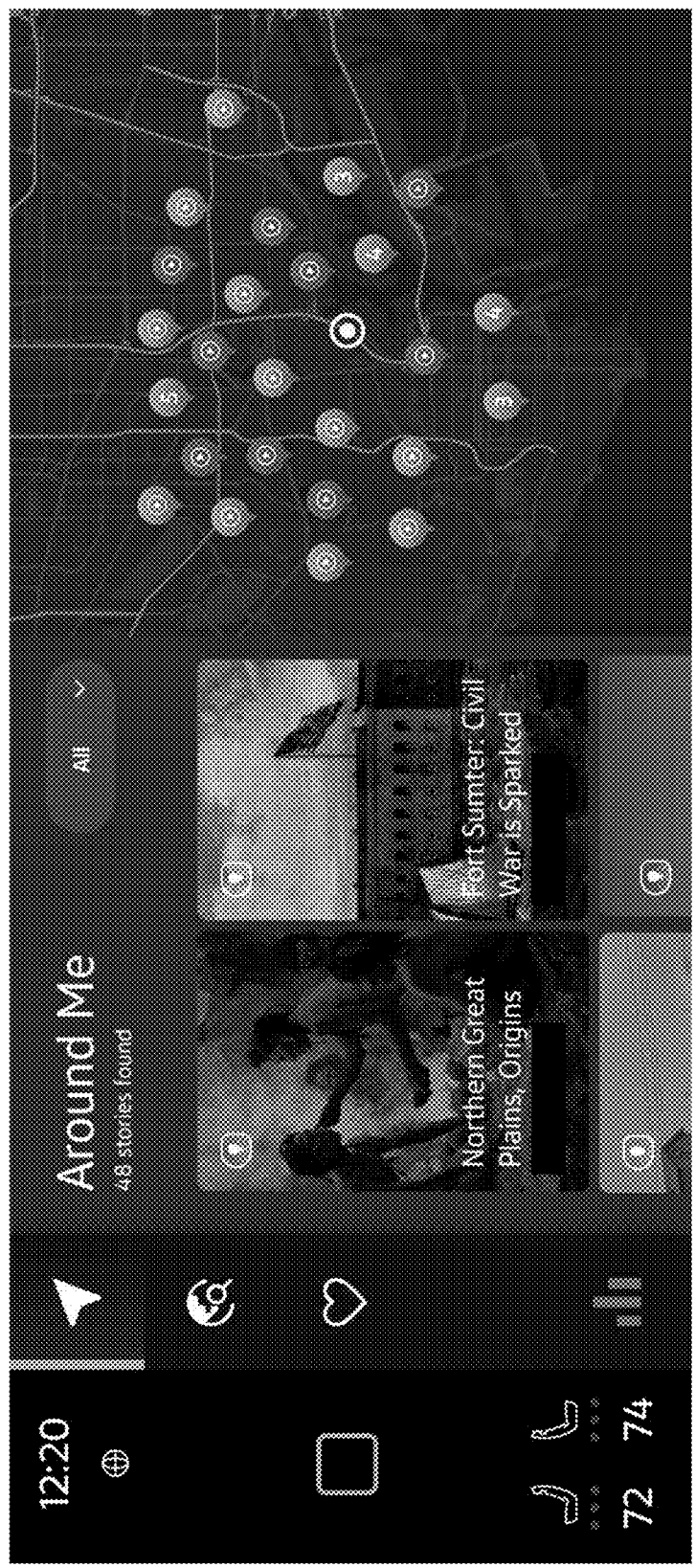

The display page—"Around Me"; one of a group of display pages corresponding to a first icon presently next to a thick vertical bar on the left—as illustrated in FIG. 3B can be used to displays graphic components representing media contents such as audio stories within a geographic area such as a 5-mile search radius around the user's or the vehicle's current location—or around another selected location such as a destination of a trip or a different specific location on the trip.

As illustrated in FIG. 3B, in the present example, the map view—or presently displayed map—visually depicts or specifically marks the user's or the vehicle's position, which are surrounded by story pins representing discovered media contents or audio stories at corresponding locations or POIs on the map view. If more than one audio story or story pin around a location or POI is available, a pin number may be used to indicate the total number of overlapping pins available at the location or POI. The map view may or may not be interactive. Story pins can be color-coded based on whether the user has completed or listened to the corresponding audio stories. For example, (completely) listened audio stories are shown as gray pins on the map (view). An audio story may be considered completed after it is fully (e.g., the entire duration, reaching the end section or endpoint, etc.) listened. In some operational scenarios, the user's or the vehicle's live position may be updated on the map (view). The map may or may not center to the live position, for example, unless or until the map is refreshed (e.g., every one minute, every two minutes, every three minutes, shorter or longer frequencies, etc.). The total number (e.g., 48, etc.) of discovered media contents or audio stories may be displayed as shown in FIG. 3B.

Figure 3C:
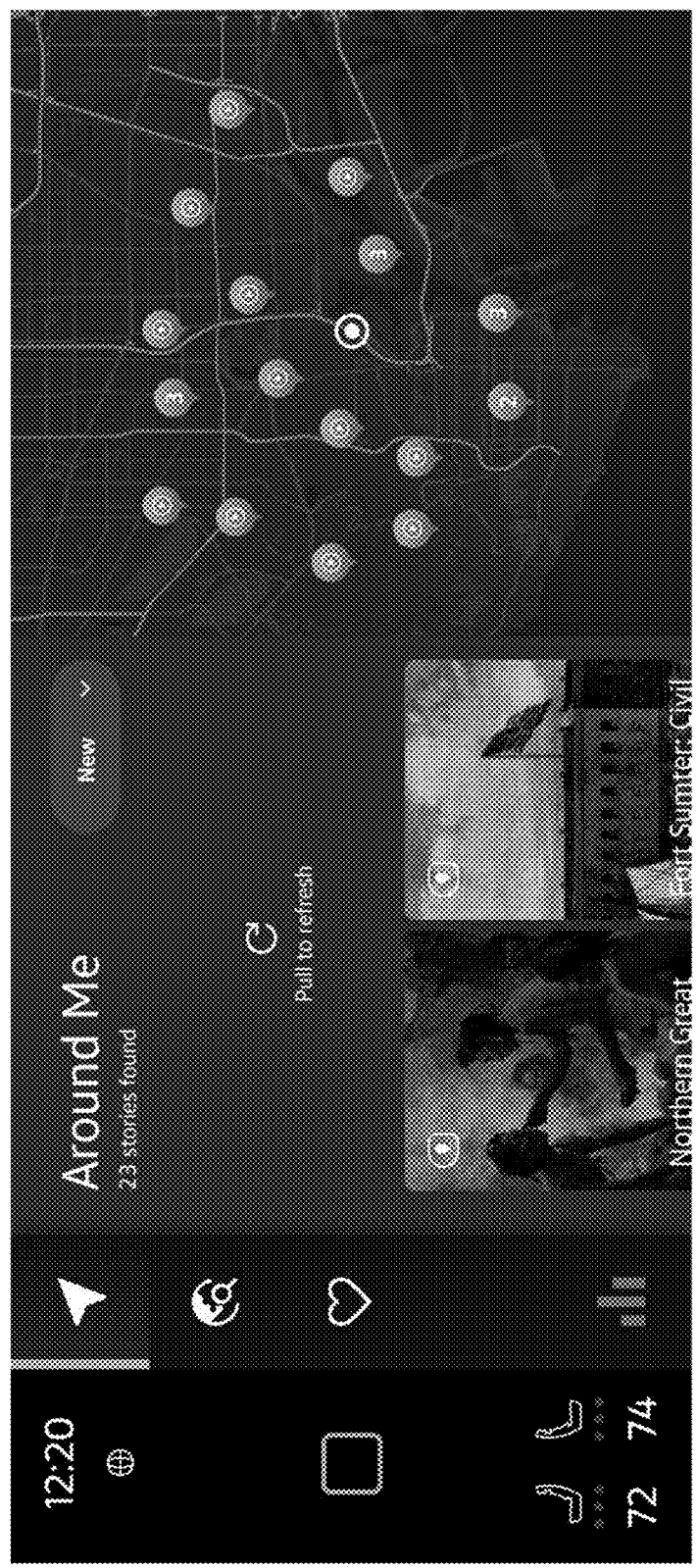

As illustrated in FIG. 3C, a media content or audio story list may be displayed—for example as tiles of images representing specific media contents or audio stories—currently with the map view on the same image display or screen. In some operational scenarios, instead of visually representing all discovered media contents or audio stories, filtering may be used to visually represent a subset such as a total number (e.g., 23, etc.) of newly discovered (or un-listened) media contents or audio stories. The media content or audio story list can be manually refreshed by the user.

Figure 3D:
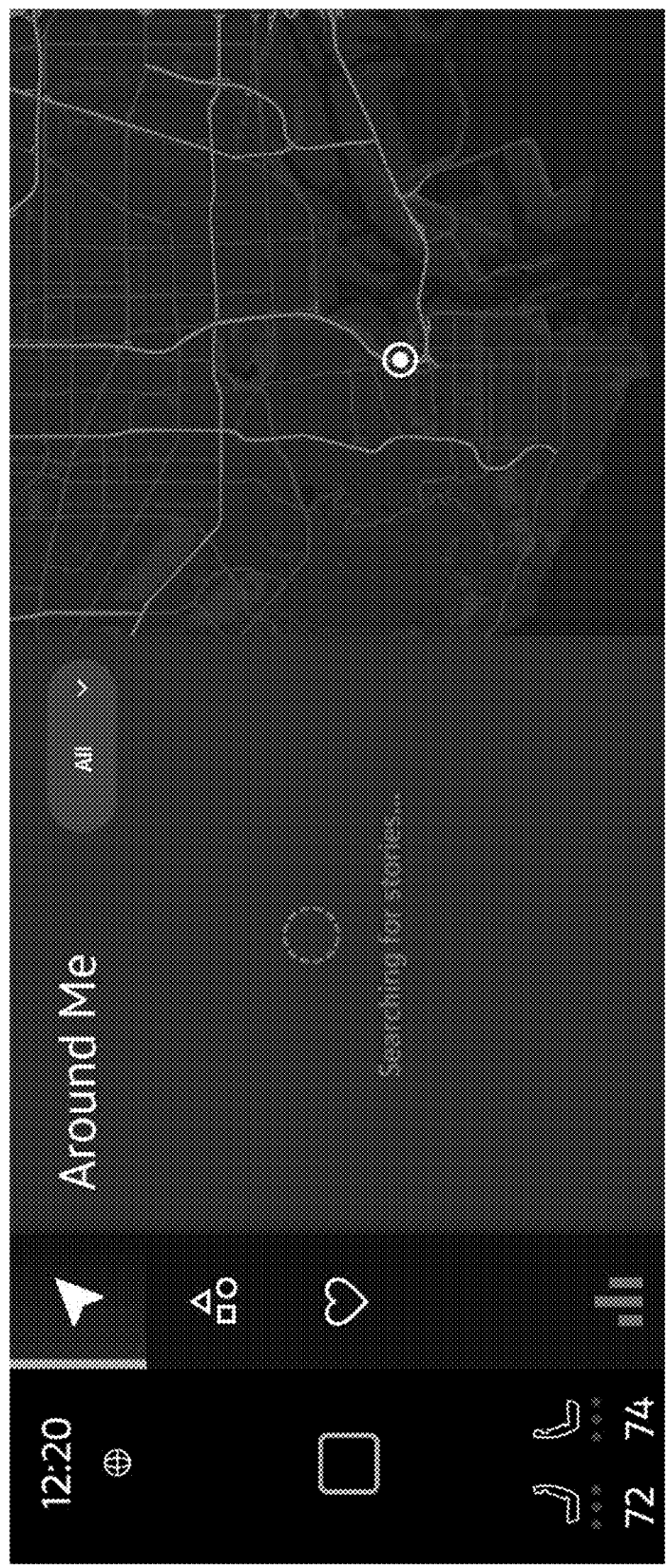

As illustrated in FIG. 3D, when the user pulls down on the story tiles, a refresh icon may be shown, and the story results (or the audio story list) are re-queried. During the refresh, placeholder or temporary graphics are shown on the tiles view to indicate loading in progress. Additionally, optionally, or alternatively, when the user's or vehicle's position is updated, refreshed or changed, nearby media contents or audio stories can be re-queried or rediscovered. The list (or image tiles) and the map view can be refreshed. On failure to refresh, an error indication or message may be displayed (e.g., "Please try again," etc.).

Figure 3E:
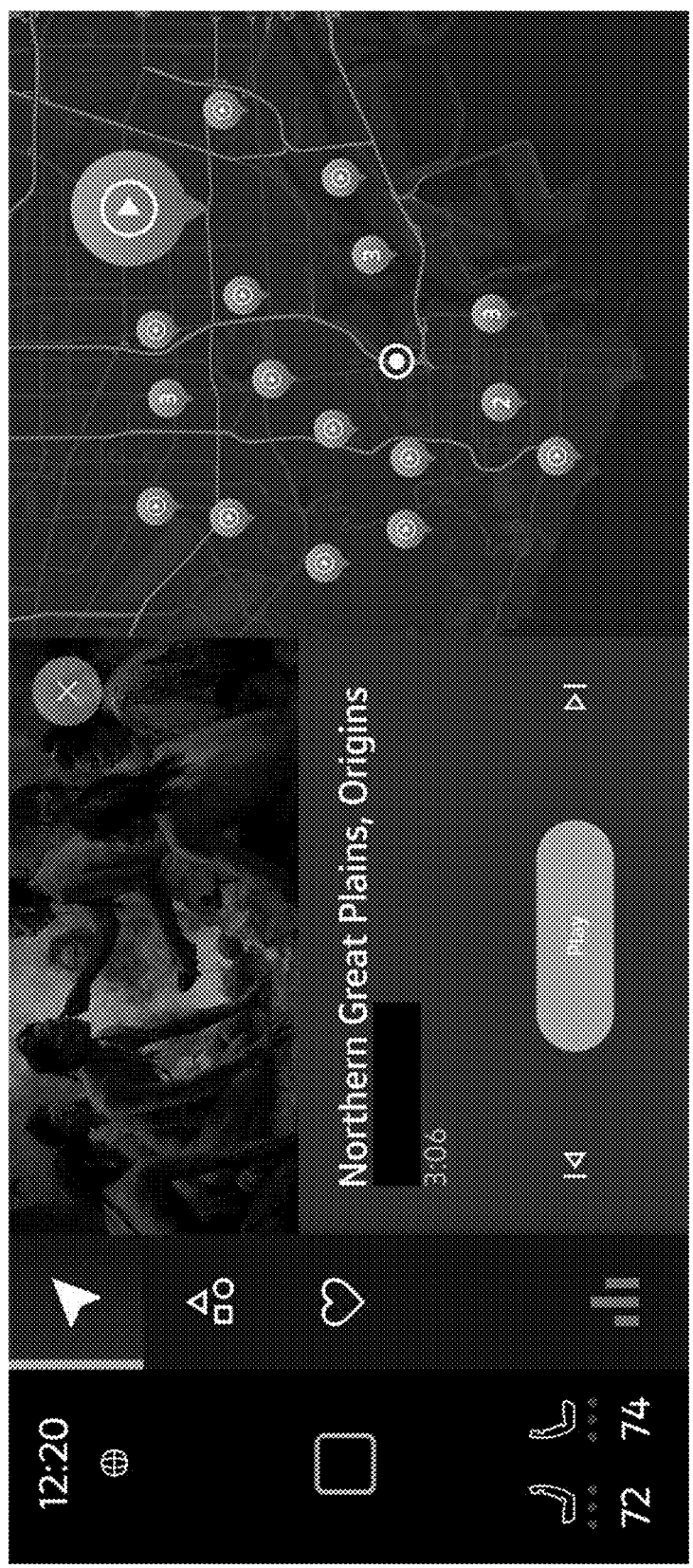

As illustrated in FIG. 3E, details of the currently selected media content or audio story—e.g., story provider, title, narrator, audio length, etc.—may be displayed in a display page of the POI navigation application. The user may select a specific (searched and/or discovered) media content or audio story for rendering or playback by way of interacting with a UI control such as an image tile or a story pin. The user can flip, rewind, skip between or among different media contents or audio stories using UI controls on the display page. These UI controls may include, but are not necessarily limited to only, any of: a "Close" UI control ("x" in a circle) to close the preview and go back to the "Around Me" display page or screen of FIG. 3B; a "Play" UI control to cause the currently selected media content or audio story to be played back in a "Now Playing" display page or screen; a "Previous story" UI control (backward double arrow) to cause a media content or audio story (e.g., in the list of discovered media contents or audio stories or a subset thereof under a filter) before the currently selected media content or audio story to play; a "Next story" UI control (forward double arrow) to cause a media content or audio story (e.g., in the list of discovered media contents or audio stories or a subset thereof under a filter) after the currently selected media content or audio story to play; and so on. On the map view, a story pin corresponding to the currently selected media content or audio story may be visually highlighted and specifically marked.

Figure 3F:
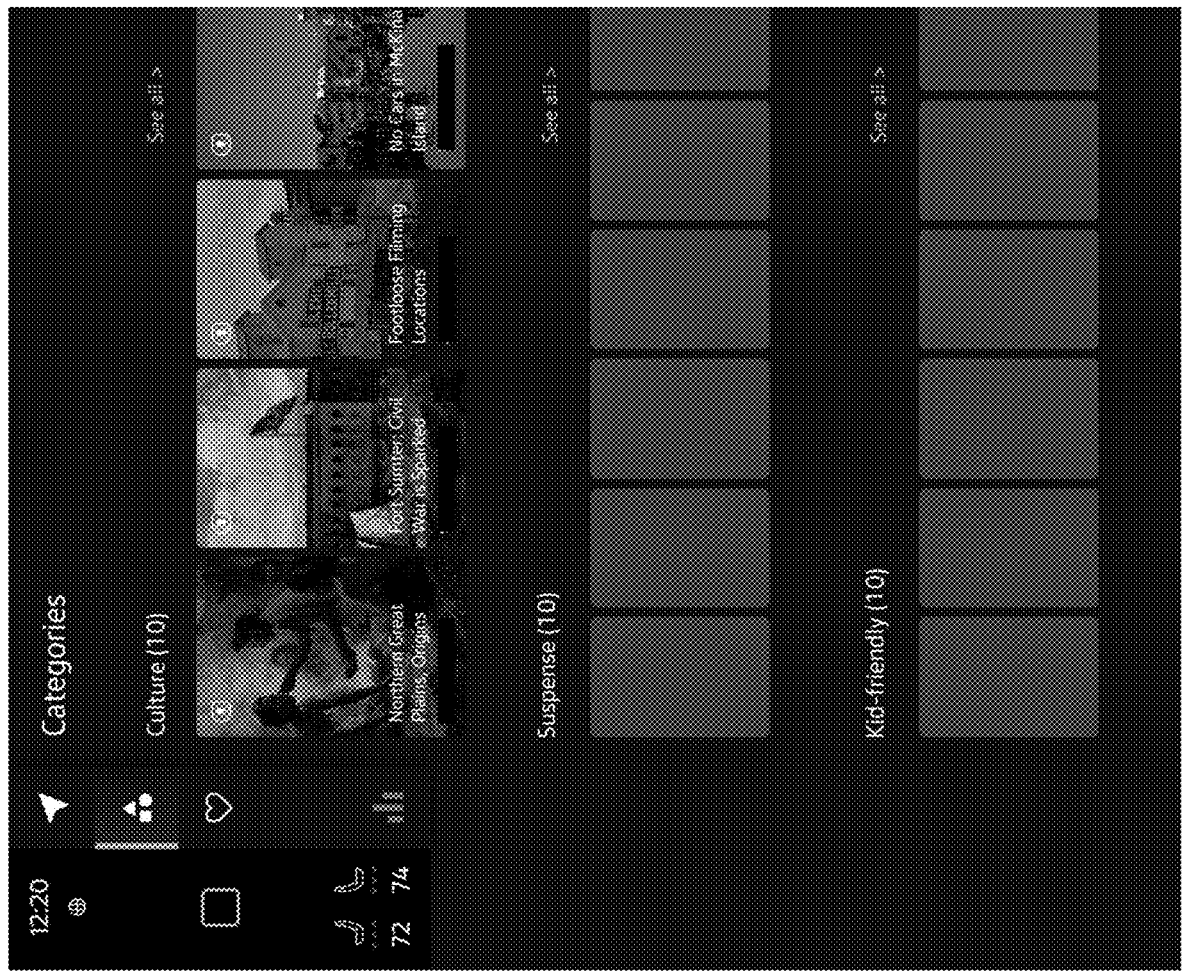

The display page—"Categories"; one of a group of display pages corresponding to a second icon presently next to a thick vertical bar on the left—as illustrated in FIG. 3F can be used to display graphic components representing different categories of media contents or audio stories and allow the user to discover more media contents or audio stories beyond what have been displayed presently on the display page.

As illustrated in FIG. 3F, this display page presently displays graphic components representing (e.g., 10, 14, 20, etc.) nearby or POI media contents or audio stories sorted by category. In some operational scenarios, the displayed POI media contents or audio stories can be provided or streamed by a specific media content or audio story provider (e.g., Autio, etc.). The user and/or the system can load or reload this display page—e.g., via a pull down user action—to show available POI media contents or audio stories based on the present (e.g., live, etc.) user's or vehicle's position or another specific location currently configured for media discovery and playback operations. The graphic components on this display page may include UI controls such as image/story tiles each of which may be selected by the user for playback. In addition, the graphic components on this display page may include UI controls representing specific categories each of which may be selected by the user to see all discovered media contents or audio stories for the currently selected category.

Figure 3G:
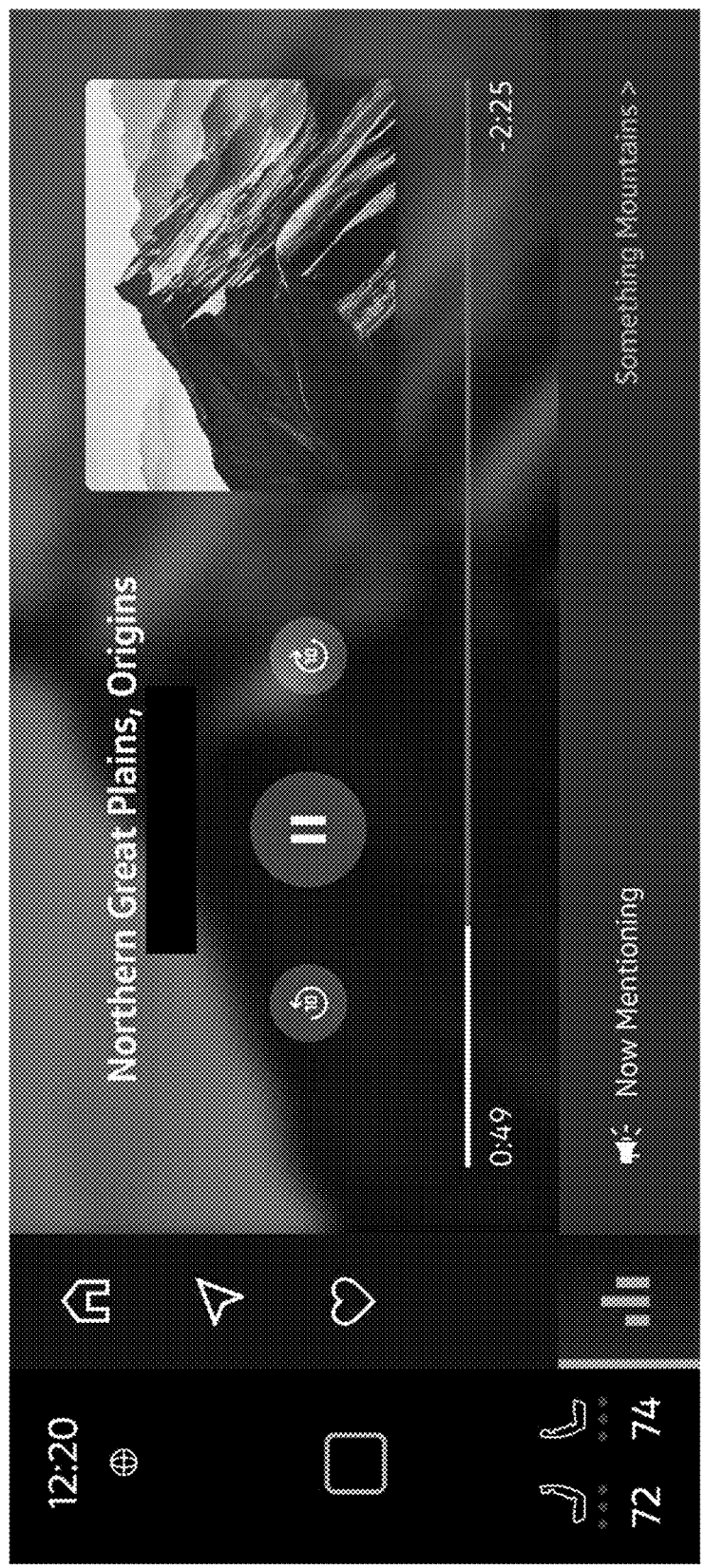

As illustrated in FIG. 3G, while the currently selected media content or audio story is being played, a story image may be displayed on the UI, for example as background or as an image (e.g., "Something Mountain", etc.) depicted in a specific area of the UI. In some operational scenarios, the image depicted in the specific area may correspond to a presently played segment of the media content or audio story. When the presently played segment mentions a location or POI represented in the map view, the image may be a photo or image of the location or POI. Graphic components such as a "Now Mentioning" toast can be shown, for example, at the bottom, allowing the user to access or navigate to the mentioned location or POI in the map view and/or other display pages and select location or POI specific operations in connection with the mentioned location or POI, while the currently selected media content or audio story is being continuously played. It should be noted that some or all of the user actions in the media discovery and playback operations may be performed through vehicle specific UI components built in with the vehicle such as audio controls that are integrated as a part of steering wheel controls and/or cluster media information controls implemented with the vehicle.

Figure 3H:
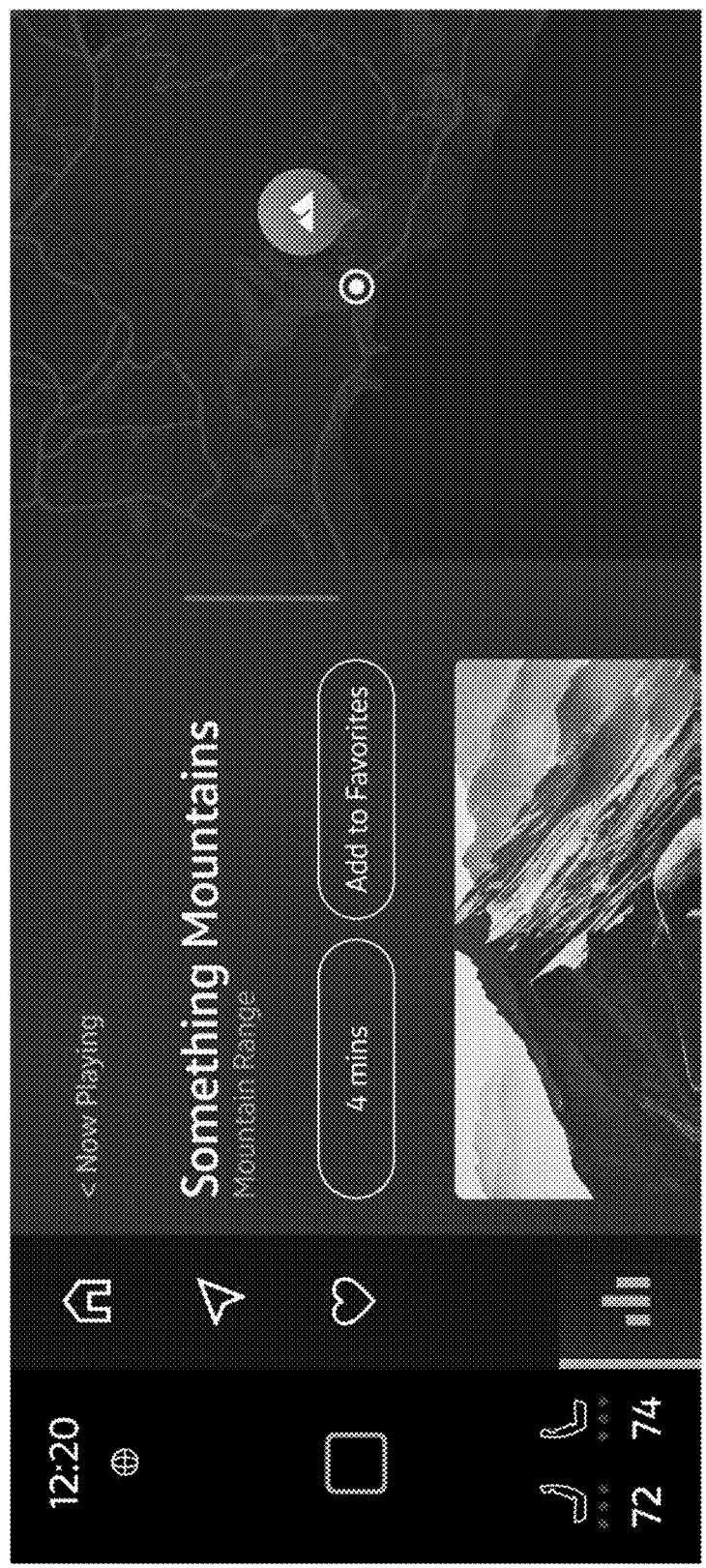

As illustrated in FIG. 3H, a display page portion with a heading (e.g., "Something Mountain," etc.) corresponding to the location or POI mentioned in the media content or audio story (see FIG. 3G) may be rendered on the image display along with the map view. The display page portion may include: the name of the mentioned location or POI, its location category (e.g., a mountain resort, etc.), one or more images of the location or POI, etc. The location or POI may be highlighted or specifically marked on the concurrently displayed map (view) in relation to the user's or vehicle's position. The story pin (icon) may be specifically selected from a plurality of icons—respectively corresponding to a plurality of location categories—to indicate the specific category of the location or POI. A navigation button may indicate a realtime estimate of driving time (4 minutes in the present example) between the user's or vehicle's current location to the mentioned location or POI. The navigation button may be operated by the user to access driving directions to the mentioned location or POI from the user's or vehicle's current location. UI controls may be provided with the overall display page or the display page portion therein to allow the user to navigate to other display pages such as a "Now Playing" display page, a previous display page, a subsequent display page, to add (with an "Add to Favorites" button) or save the mentioned location or POI among the user's saved favorites or saved POIs.

Figure 3I:
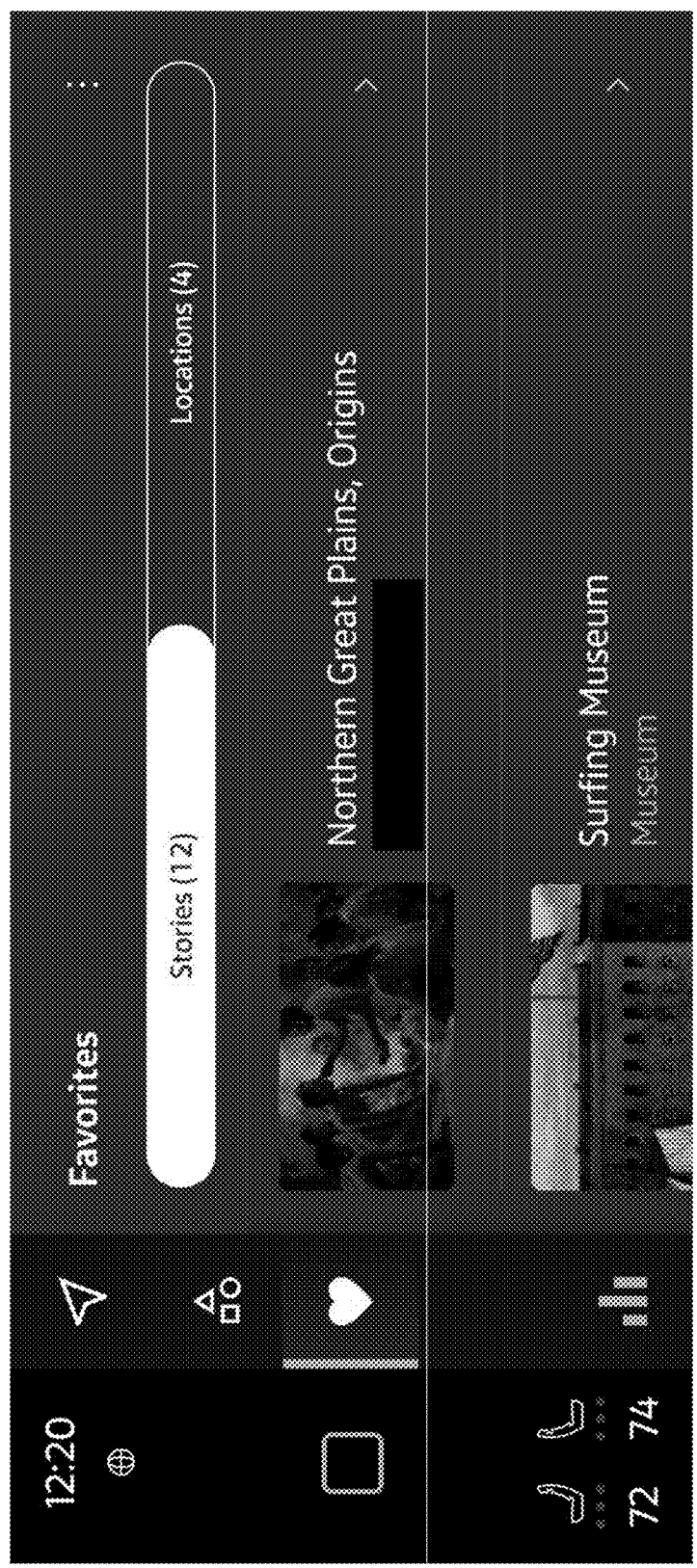
Figure 3J:
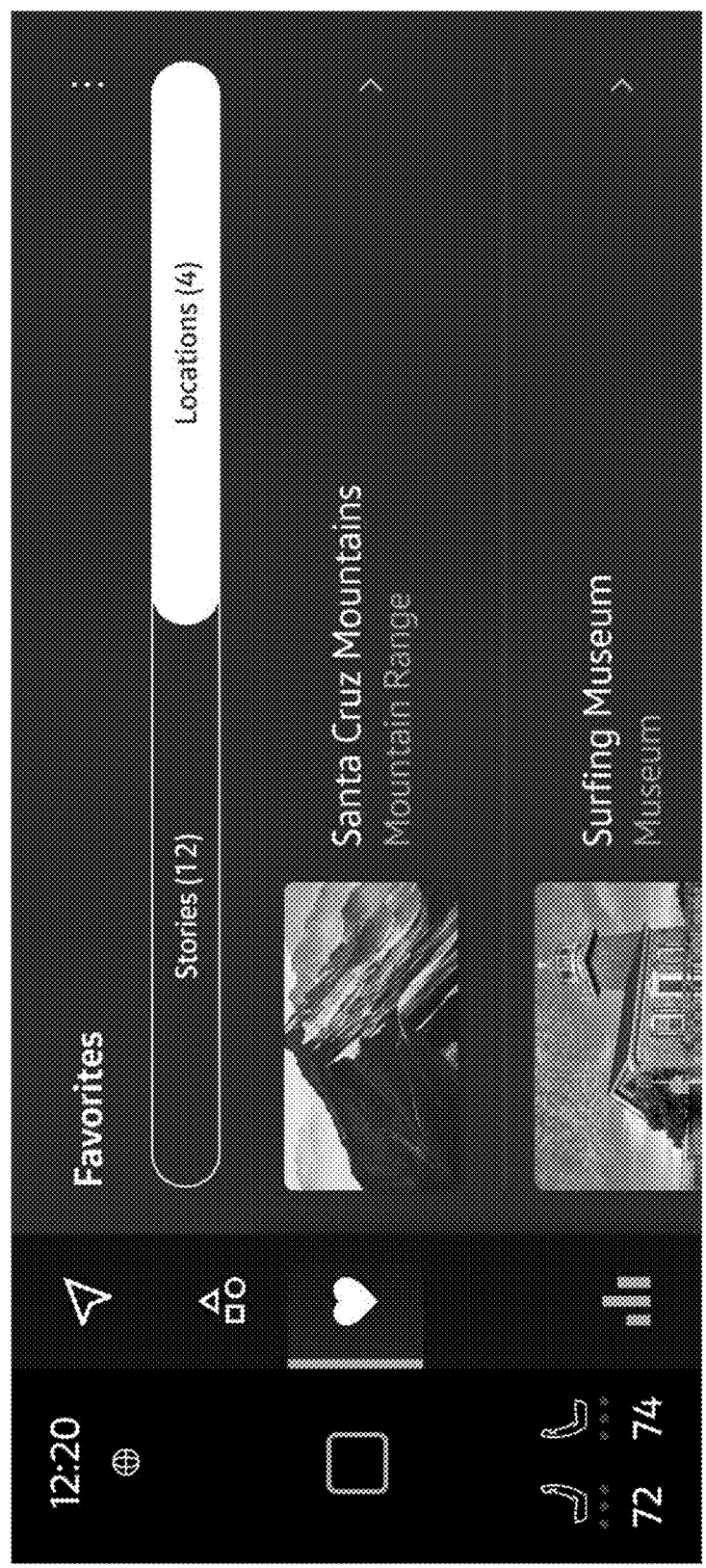

Display pages such as illustrated in FIG. 3I and FIG. 3J may be used to display media contents (or audio stories) and locations (or POIs) in the user's saved favorites. The user can select any of these media contents or audio stories for playback or rendering. The user can select any of these locations or POIs to receive driving directions to navigate to these locations or POIs. The user can delete or remove any, some or all of these media contents or audio stories and locations or POIs from the user's saved favorites.

Under techniques as described herein, a wide variety of POI or non-POI media and related contents including but not limited to audio stories, videos, etc., may be discovered from various media and/or data sources and presented or rendered through UI display pages, audio player, video player, image display, audio system, vehicle components, etc., built in with the vehicle.

Example POI or non-POI media and related contents may be, but are not necessarily limited to only, discovered from cloud-based or non-cloud-based media and/or data sources providing media and related contents relating to any, some or all of: audio stories; videos; tour guide; travel: storytelling; history; city guides; events; news; music; role playing; housing; food beverage; games; podcasts; wellbeing; artificial intelligence generated; and so on.

Discovered media and related contents may be classified, ranked, filtered (e.g., immersive, original content, etc.) and/or presented (e.g., as media content or source related information displayed on UIs, etc.) using one or more criteria and/or one or more numeric or non-numeric measures/bases, For example, media and/or data sources may be ranked by their ratings in the total number of users providing feedbacks, app store ratings (e.g., in a numeric value range of 1-5, etc.), app store ranking (e.g., #7 among all the ranked applications downloadable from an app store, etc.), categories (e.g., travel, news, fitness, navigation, entertainment, etc.), indication of whether ratings and feedbacks are (user) community based, indication of whether the source supports dynamic or real time media contents or related data discovery, etc.

3.3. Initializing Discovery and Playback

Figure 4A:
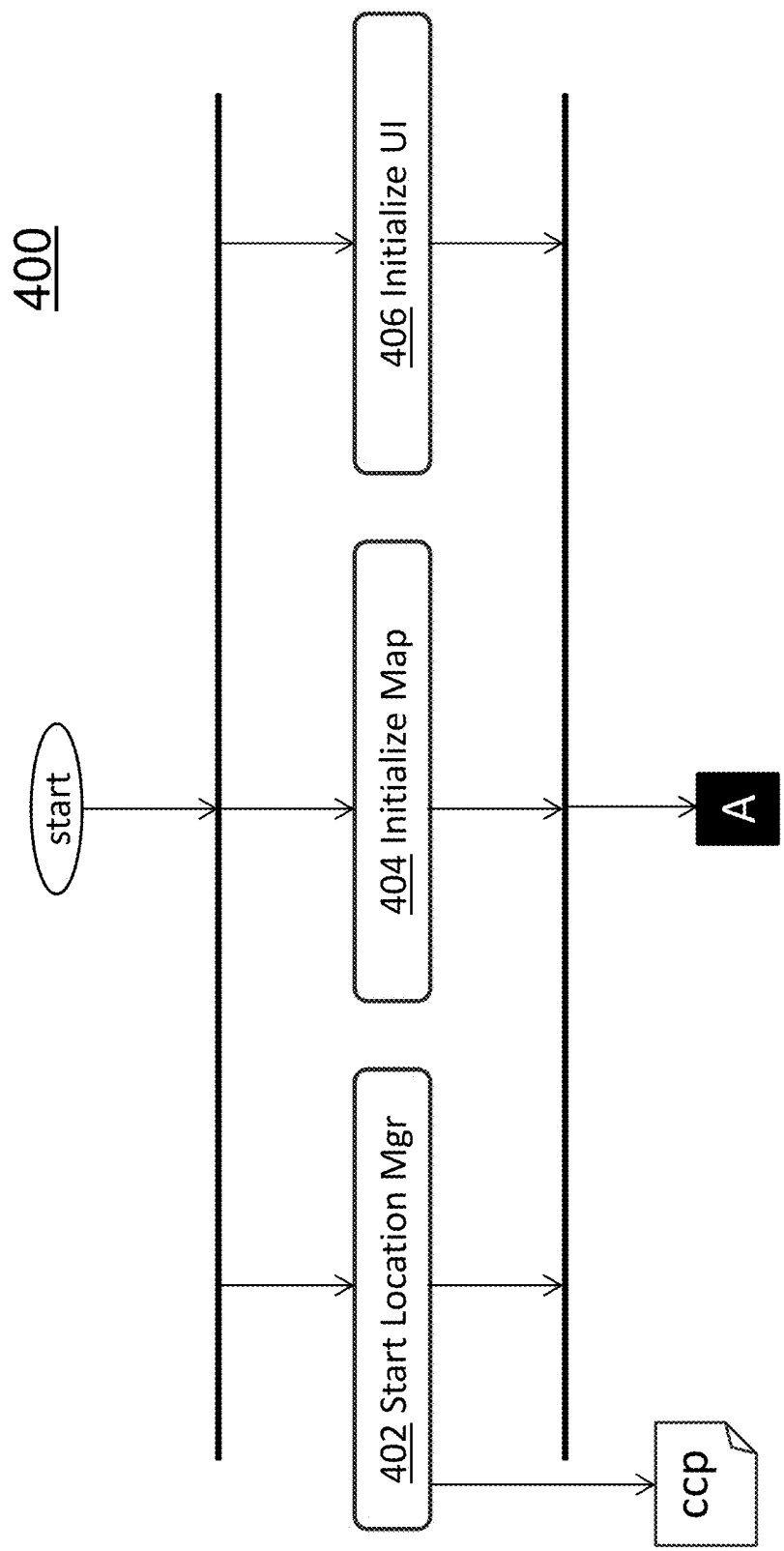
FIG. 4A through FIG. 4E illustrate example process flows.

FIG. 4A illustrates an example process flow 400 for initializing a POI media discovery and playback application that may operate with or that may be integrated with a navigation application in a vehicle according to an embodiment. In some embodiments, one or more computing devices or components may perform this process flow. The process flow may go to three processing blocks 402 through 406 from an application or system start time point. These processing blocks 402 through 406 may be executed or performed in parallel, in series or in part parallel in part series.

In block 402, a system (e.g., POI navigation application/system, 100 of FIG. 1A, etc.) as described herein starts a location manager. The location manager may be a computing process or a process thread therein—e.g., implemented as a combination of hardware and software including but not limited to geolocational sensor(s) built in with the user's vehicle—dedicated to obtaining the user's or vehicle's current or live (car) position denoted as "ccp" from time to time, periodically, on demand, etc. As the vehicle may be moving on the road, the user's or vehicle's position ("ccp") may be changed over time and continuously acquired by the location manager by way of the geolocational sensors. The user's or vehicle's live or real time position may be sent or provided by the location manager to other components/subsystems/applications/threads/processes of the system with no or little time latency.

In block 404, the system initializes a map (view) to be rendered in an image display, for example built in with the vehicle. The system may interact with map data sources to send the current location to the map data sources and to obtain map data from the map data sources. The map data may include, but is not necessarily limited to only, map rendering data to be used as basis for rendering the map (view) on the image display.

In block 406, the system or a POI navigation application therein initializes UI, for example with an initial/landing display page or a search box in the map view rendered or displayed on the image display, as illustrated in FIG. 2A or FIG. 3A. The current location ("ccp") may be specifically marked on the display page or map view.

Figure 4B:
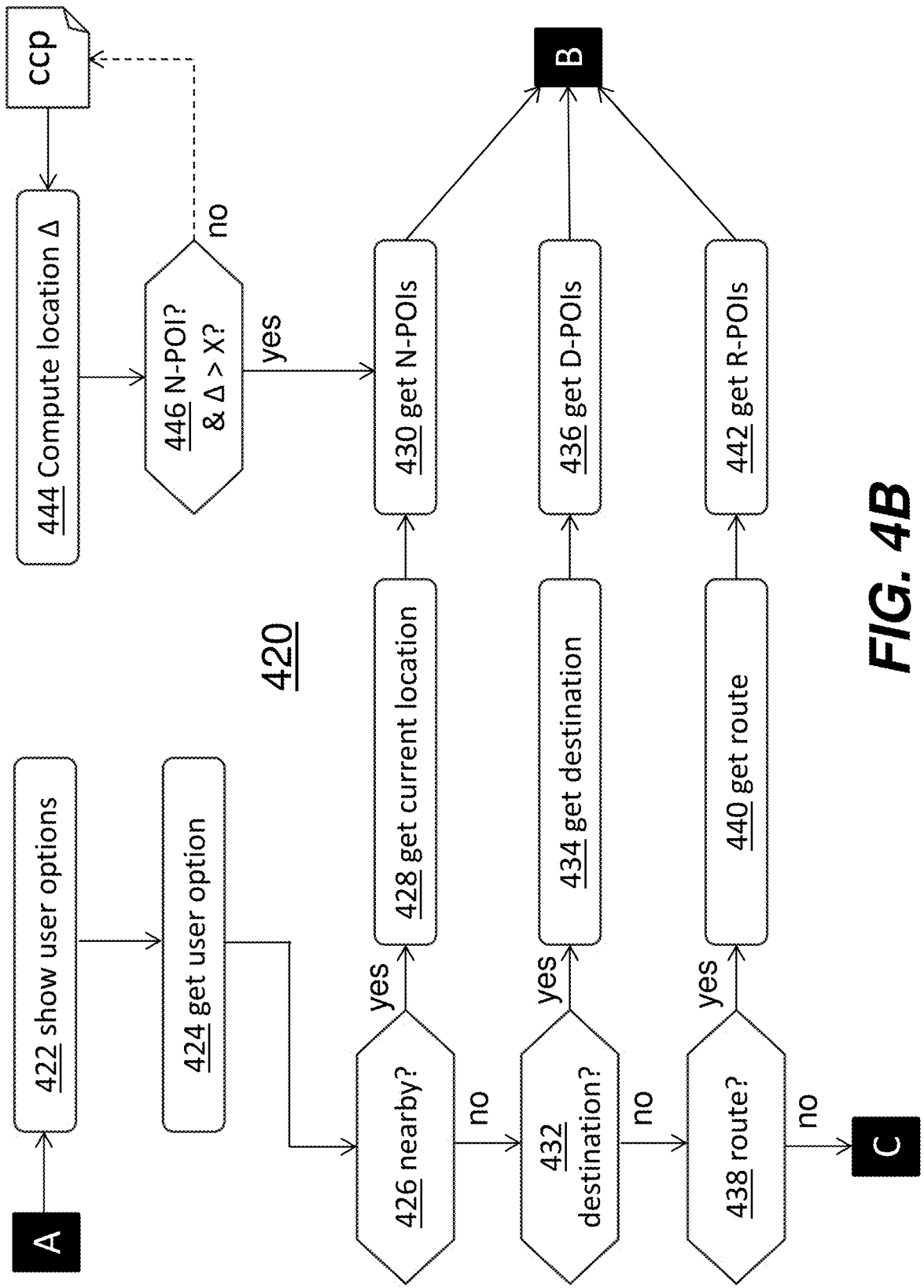

Upon completion of the operations in the processing blocks 402 through 406, the process flow goes to block A or process flow 420 of FIG. 4B.

3.4. Discovering POIs

FIG. 4B illustrates an example process flow 420 for discovering and generating POIs for which POI media contents or audio stories may be selected for playback or access according to an embodiment. In some embodiments, one or more computing devices or components may perform this process flow.

In block 422, the system (e.g., POI navigation application/system, 100 of FIG. 1A, visually, audibly, etc.) presents the user a set of user selectable options for media content or audio story discovery, for example on a display page presently rendered or displayed on the image display. By way of illustration but not limitation, the set of user selectable options may include three options corresponding to determinations made in three blocks 426, 432 and 438. In various operational scenarios, more or fewer options may be used for media discovery and playback operations.

In block 424, the system receives specific user input specifying a specific user selectable option in the set of user selectable options for media content or audio story discovery. The user input may be generated or inputted as user interaction data with the user through mechanical, tactile, audio or graphic UI controls of the UI, etc.

In block 426, the system determines whether the specific user selectable option corresponds to a first mode (denoted as "nearby") for media discovery and playback operations. If so, the process flow goes to block 428. Otherwise, the process flow goes to block 432.

In block 428, the system determines the user's or vehicle's (e.g., live, present, in real time, etc.) current location ("ccp"), for example from the previously initialized or started location manager.

In block 430, the system uses the user's or vehicle's current location ("ccp") to obtain or generate a first set of media content or audio story selections corresponding to a first set of (POI) media contents or audio stories respectively for a first set of locations or POIs represented in the (e.g., live, present, in real time, etc.) map view displayed or rendered on the image display. For simplicity, the first set of locations or POIs to which the first set of media contents or audio stories corresponds may be referred to as "N-POIs".

The first set of media contents or audio stories may be selected from a plurality of media contents or audio stories from one or more media content or audio story sources. In a first example, the map view may be centered at or near the user's or vehicle's current position, and the first set of locations or POIs may include any location or POI in the displayed/rendered map view for which a media content or audio story is discovered. In a second example, the map view may or may not be centered at or near the user's or vehicle's current position, and the first set of locations or POIs may include any location or POI for which a media content or audio story is discovered AND which has a distance from the user's or vehicle's current position within a specific distance radius (e.g., 3 miles, 5 miles, a user and/or system specified distance, etc.) of the user's or vehicle's current position.

Some or all of the discovered media contents or audio stories as represented by the first set of media contents or audio stories—or selections of these discovered media contents or audio stories—may be presented (e.g., concurrently with the map view, etc.) on the UI for the user to view specific information relating to these media contents or audio stories, to select any of these media contents or audio stories for playback or rendering, to obtain additional information relating to these media contents or audio stories, media content sources, user feedback based rankings or ratings, and so on. Additionally, optionally or alternatively, Some or all of the discovered locations or POIs as represented by the first set of locations or POIs may be (e.g., concurrently, etc.) specifically highlighted or marked in the map view.

The process flow subsequently goes to block B or process flow 450 of FIG. 4C.

In block 432, the system determines whether the specific user selectable option corresponds to a second mode (denoted as "destination") for media discovery and playback operations. If so, the process flow goes to block 434. Otherwise, the process flow goes to block 438.

In block 434, the system determines the destination of a currently specified/selected route or trip, for example from the previously initialized or started location manager and/or the user.

In block 436, the system uses the destination to obtain or generate a second set of media content or audio story selections corresponding to a second set of (POI) media contents or audio stories respectively for a second set of locations or POIs. For simplicity, the second set of locations or POIs to which the second set of media contents or audio stories corresponds may be referred to as "D-POIs".

The second set of media contents or audio stories may be selected from the plurality of media contents or audio stories from the one or more media content or audio story sources such that each location or POI in the second set of locations or POIs to which the second set of media contents or audio stories corresponds has a distance from the destination within a specific distance radius (e.g., 3 miles, 5 miles, a user and/or system specified distance, etc.) of the destination.

Some or all of the discovered media contents or audio stories as represented by the second set of media contents or audio stories—or selections of these discovered media contents or audio stories—may be presented (e.g., concurrently with the map view, etc.) on the UI for the user to view specific information relating to these media contents or audio stories for playback or rendering, to obtain additional information relating to these media contents or audio stories, media content sources, user feedback based rankings or ratings, and so on. Additionally, optionally or alternatively, Some or all of the discovered locations or POIs as represented by the second set of locations or POIs may be (e.g., concurrently, etc.) specifically highlighted or marked in the map view.

The process flow subsequently goes to block B or process flow 450 of FIG. 4C.

In block 438, the system determines whether the specific user selectable option corresponds to a third mode (denoted as "route") for media discovery and playback operations. If so, the process flow goes to block 440. Otherwise, the process flow goes to block C, which may represent an operational mode corresponding to running the native navigation application without media discovery and playback functionality, or which may represent different operational mode(s) for running the POI navigation application with media discovery and playback functionality.

In block 440, the system determines a currently specified/selected route or trip, for example from the previously initialized or started location manager and/or the user.

In block 442, the system uses the specified/selected route or trip to obtain or generate a third set of media content or audio story selections corresponding to a third set of (POI) media contents or audio stories respectively for a third set of locations or POIs. For simplicity, the third set of locations or POIs to which the third set of media contents or audio stories corresponds may be referred to as "R-POIs".

The third set of media contents or audio stories may be selected from the plurality of media contents or audio stories from the one or more media content or audio story sources such that each location or POI in the third set of locations or POIs to which the third set of media contents or audio stories corresponds has a distance from the nearest point on the specified/selected route or trip within a specific distance (e.g., 3 miles, 5 miles, a user and/or system specified distance, etc.) of the nearest point.

Some or all of the discovered media contents or audio stories as represented by the third set of media contents or audio stories—or selections of these discovered media contents or audio stories—may be presented (e.g., concurrently with the map view, etc.) on the UI for the user to view specific information relating to these media contents or audio stories, to select any of these media contents or audio stories for playback or rendering, to obtain additional information relating to these media contents or audio stories, media content sources, user feedback based rankings or ratings, and so on. Additionally, optionally or alternatively, Some or all of the discovered locations or POIs as represented by the third set of locations or POIs may be (e.g., concurrently, etc.) specifically highlighted or marked in the map view.

The process flow subsequently goes to block B or process flow 450 of FIG. 4C.

3.5. Map Updating and User Selection

Figure 4C:
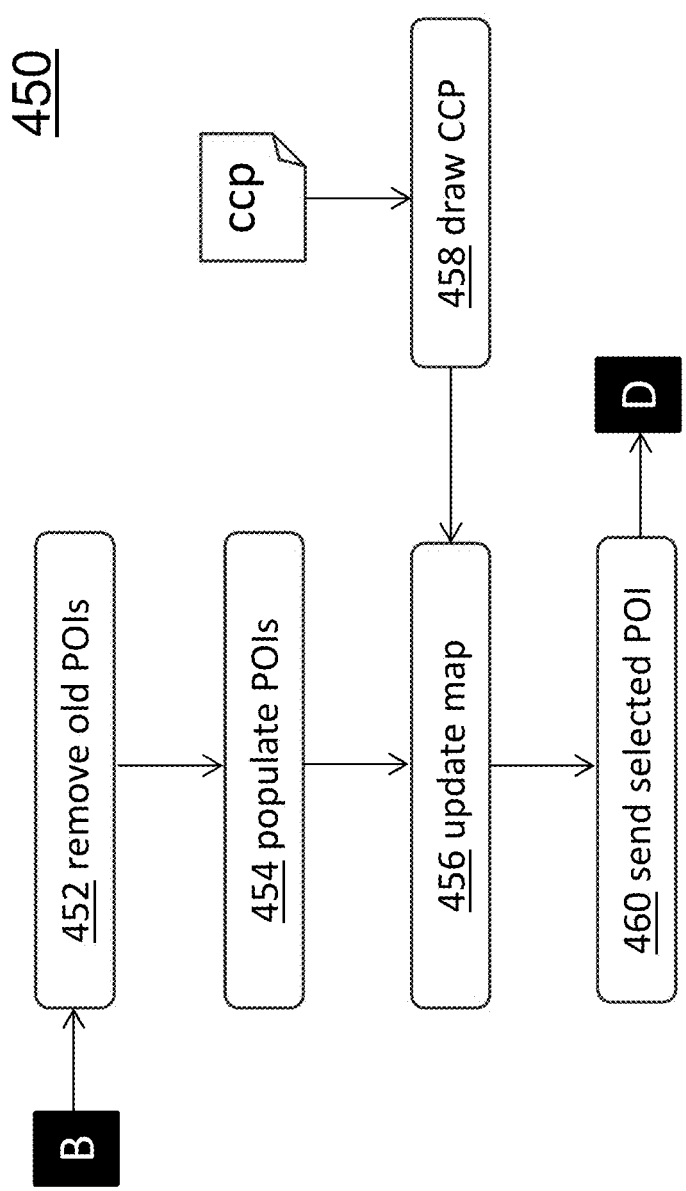

FIG. 4C illustrates an example process flow 450 for updating map views with POIs and allowing the user to select specific media contents or audio stories corresponding to specific POIs among all the POIs according to an embodiment. In some embodiments, one or more computing devices or components may perform this process flow.

At any given time (e.g., initial time, in a media discovery and playback session, etc.), the map view may be displayed or rendered on the image display of the vehicle. In block 458, the user's or vehicle's current position ("ccp") may be specifically drawn or highlighted on the map view.

As explained with the process flow 420 of FIG. 2B, the user may select a specific option or operational mode (e.g., "nearby", "destination", "route", etc.) for media discovery and playback. Correspondingly, a (new or updated) set of locations or POIs (e.g., "N-POIs", "D-POIs", "R-POIs", etc.) corresponding to a (new or updated) set of POI media contents or audio stories may be identified or determined based on the specific option or operational mode selected by the user.

In block 452, the system removes some or all existing or old POIs that may have been specifically marked or highlighted with the current map view displayed or rendered on the image display.

In block 454, the system populates the current map view with the (new or updated) set of locations or POIs.

In block 456, the system displays or renders the current map view and specifically mark or highlight some or all locations or POIs in the (new or updated) set of locations or POIs. Additionally, optionally or alternatively, the system may provide one or more UI controls that may be used by the user to select some or all media contents or audio stories in the (new or updated) set of media contents or audio stories corresponding to the (new or updated) set of locations or POIs.

In block 460, in response to determining that user interaction date generated from interactions between the user and the UI indicates that the user has selected a specific location/POI in the (new or updated) set of locations or POIs or a specific media content or audio story in the (new or updated) set of media contents or audio stories, the system may send or provide the user's selection to a specific media content or audio story source and initiate downloading or streaming of the specific media content or audio story for playback or rendering through the immersive media player 124 of FIG. 1C and/or the media renderer 114 of FIG. 1B (e.g., image display, audio system, etc.) in the vehicle.

3.6. Automatic POI Updating

As the vehicle may be moving during the user's media discovery and playback session, at any given time, the user's or vehicle's current position may be changing accordingly. Hence, some locations or POIs for which POI media contents or audio stories are discovered in the first operational mode ("nearby") in relation to the user's or vehicle's previously measured current position at a previous time point may no longer be satisfying POI media content criteria (e.g., distance criteria of within 3 or 5 miles from a designated point, etc.) for the user's or vehicle's present or live current position at the current time after the vehicle is moved.

As illustrated in FIG. 4B, automatic POI updating operations may be performed, for example in a separate or background computer process or processing thread or a process sub-flow, in addition to other operations. The automatic POI updating operations may be performed periodically (e.g., every minute, every three minutes, etc.) or on demand to generate updated POIs or updated media contents or audio stories corresponding to the updated POIs based on the user's or vehicle's present or live current position as determined contemporaneously with no or little time latency while the automatic POI updating operations are being performed.

More specifically, in block 444, the system requests or invokes the location manager to determine, provide or compute the user's or vehicle's present or live current position or location.

In block 446, the system determines whether the present operational mode for media discovery and playback is the first operational mode ("nearby") in which POI media contents or audio stories are determined based on spatial relationships such as distances between locations or POIs and the user's or vehicle's current position. If so, the system computes the difference between the user's or vehicle's last current position used for POIs or media discovery and the user's or vehicle's present or live current position determined in block 444. Otherwise, the processing thread or process sub-flow loops back to block 444 for the next iteration of the automatic POI updating operations (e.g., in a background process or thread, after waiting for one minute, after waiting for three minutes, etc.).

The system further determines whether the difference between the user's or vehicle's last current position used for POIs or media discovery and the user's or vehicle's present or live current position is greater than a distance threshold denoted as "X".

In response to determining that the difference is no greater than the distance threshold "X", the processing thread or process sub-flow loops back to block 444 for the next iteration of the automatic POI updating operations (e.g., in a background process or thread, after waiting for one minute, after waiting for three minutes, etc.).

In response to determining that the difference is greater than the distance threshold "X", the processing thread or process sub-flow goes to block 430 to obtain or generate or determine POIs or POI media contents or audio stories in relation to the user's or vehicle's present or live current position and to continue to process flow 450 to update maps, to interact with the user for media discovery and playback operations, and so on.

3.7. POI Media Rendering

Media contents such as audio stories may contain different chapters, segments or scenes that orally mention or visually depict geographic locations. Some or all of these geographic locations may be deemed or used as points of interest that can be integrated along with the media contents or audio stories into, or visually represented in, the POI navigation application 104 of FIG. 1A or FIG. 1B. Location or POI specific operations such as accessing or retrieving realtime navigation directions/routes to a specific location or POI and/or location accommodation information and/or weather/traffic conditions may be enabled for each POI represented in the POI navigation operation. The user 110 of the vehicle can operate with the UI 110 or UI controls represented in the POI navigation application 104 to invoke any of these operations in connection with each such POI if so desired.

For example, an audio story rendered by the immersive media player 124 of FIG. 1C and/or the media renderer 114 of FIG. 1B may be talking about The Golden Gate Bridge, which may be determined by the system 100 as a specific geographic location within the geographic area depicted in the present navigation map (or map view) concurrently rendered by the POI navigation application 104. In response to determining that the geographic location satisfies applicable POI or distance criteria or thresholds in relation to the user's or vehicle's location, destination or route, the geographic location of The Golden Gate Bridge can be specifically highlighted or marked as a point of interest on the navigation map or map view. Other locations or venues (e.g., government locations, streets, restaurants, beaches, hotels, parks, etc.) within the present map view of the POI navigation application 104 may be mentioned by audio stories contemporaneously being played back by the immersive media player 124 of FIG. 1C and/or the media renderer 114. Some or all of these locations or venues may be deemed or used as POIs and visually depicted—specifically highlighted or marked—in the present map view.

Each POIs or marks thereof may be implemented as UI controls that can be selected or operated by the user 110 to invoke or access a respective set of operations specific to each POI in the POIs represented in the present map view. The respective set of operations may be used to enable the user 110 to interact with that location such as viewing location or POI specific operational options, getting direction(s), making reservation(s), completing online computer-implemented transaction(s), etc.

As noted, 360 degree or 3D audio technologies may be implemented by the audio system in the media renderer 114 operating with the immersive media player 124 of FIG. 1C to enable 360 degree or 3D audio rendering or sound productions in the vehicle. In some operational scenarios, the system 100 of FIG. 1A or the media discovery and rendering core 102 and/or the immersive media player 124 and/or the media renderer 114 therein, can dynamically modify audio metadata to specify a spatial location and/or spatial direction of a sound source (e.g., a character's or narrator's voice in an audio story, etc.) as the sound source is mentioning a POI to correspond to a spatial location and/or spatial direction of the POI in reference to the current position and/or the current direction of the vehicle. As a result, the user can get a spatial cue from the direction of the sound source mentioning a POI as rendered by the audio system, for example, by selecting one or more specific audio speakers at respective speaker locations for sound reproduction or by audio spatial panning using one or more audio speakers at respective speaker locations. The spatial cue indicates or corresponds to the actual or physical spatial direction of the POI in relation to the user or vehicle.

For example, if the vehicle is driving towards north and there is a restaurant on the west or left side of the vehicle, then a sound source in the audio story such as the narrator's voice presently mentioning the restaurant may be specified by the media discovery and rendering core 102 and spatially rendered by the immersive media player 124 and/or the media renderer 114 using audio speakers of the audio system built in with the vehicle as coming from the left (or POI) side of the vehicle.

3.8. Vehicle Components as Rendering Media

Media or multimedia content rendering typically involves image/video rendering on image displays and/or audio rendering or sound reproduction through audio systems.

Figure 1G:
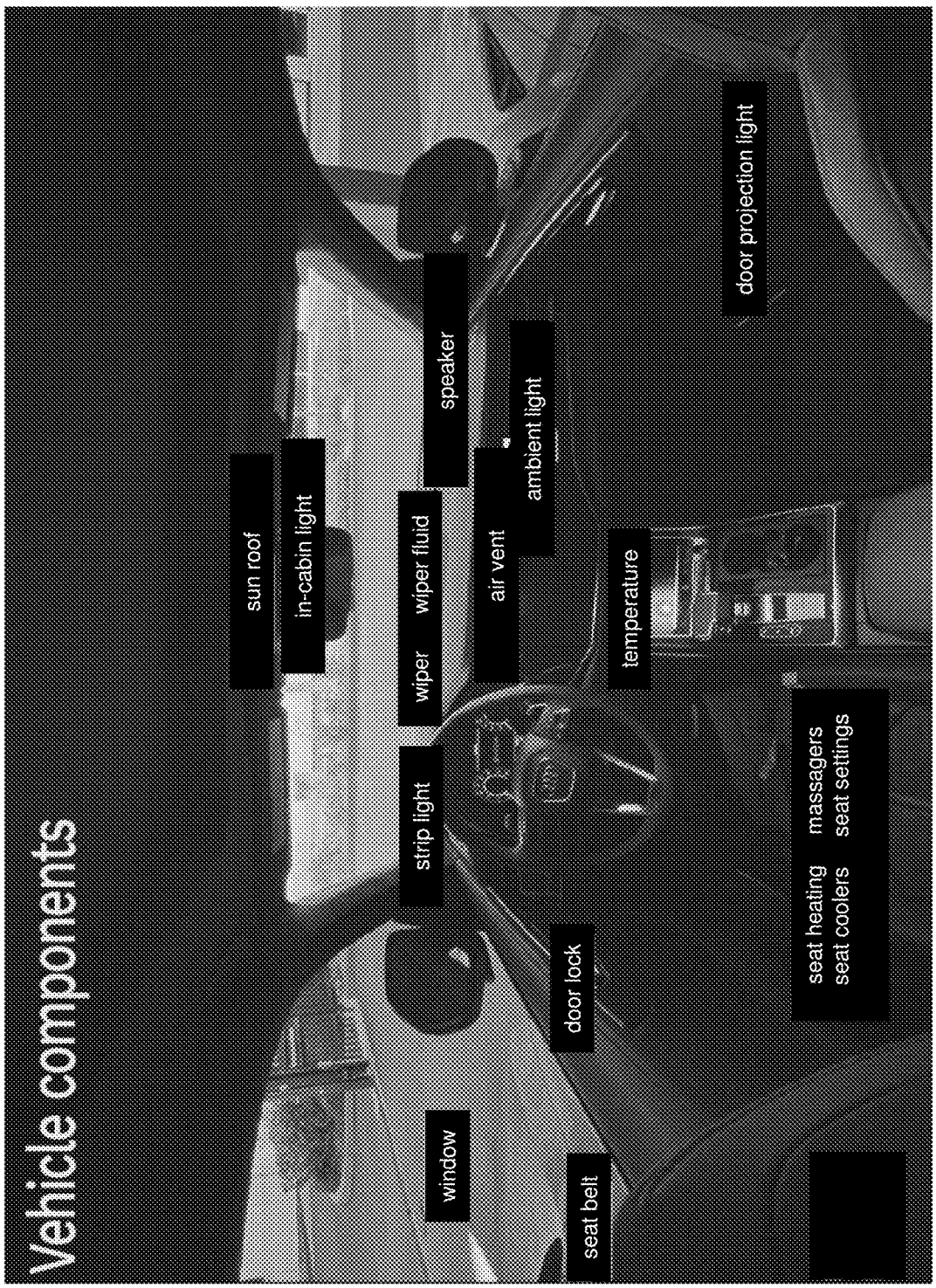
FIG. 1G illustrates example vehicle components that may be used in media rendering operations.

In some operational scenarios, under techniques as described herein, vehicle components in a vehicle—which may include, but not necessarily limited to only, any of those illustrated in FIG. 1G—may be used—e.g., to create special effects concurrently or synchronized to audiovisual rendering—by the vehicle component media application 126 in the media discovery and rendering core 102 along with image display(s) and/or audio system(s) in the media renderer 114 of the vehicle operating with the immersive media player 124 to render media or multimedia contents.

For example, one or more vehicle components may be used for creating special effects in storytelling in connection with an audio story or content, thereby creating a highly immersive user media consumption experience as compared with using an audio system alone. Hence, under the techniques as described herein, vehicle components can be used as additional rendering media in addition to or other than audio rendering media and/or video/image rendering media.

An audio story or media content as described herein can include both audio data and/or audio metadata to be used by the immersive media player 124 and/or the media renderer 114 for sound generation or reproduction. The audio data may be used to generate or reproduce sounds of various sound sources depicted or represented in the audio story or content. The audio metadata—which corresponds to or is associated with the audio data—may be used to specify or define spatial positions and/or spatial directions of the sound sources in a sound field generated by the immersive media player 124 and/or the media renderer 114 in an audio listening or rendering environment such as one surrounding the user located at the driver seat of the vehicle.

Under techniques as described herein, in addition to the audio data and metadata, the audio story or media content as described herein can include vehicle component metadata corresponding to or associated with the audio data and/or audio metadata.

The vehicle component metadata in the audio story or content may carry or include specific timestamps in the audio story to trigger specific operations or actions of specific vehicle components in the vehicle used for rendering the audio story. The specific vehicle components involved—or playing specific roles—in the audio story rendering may include, but are not necessarily limited to only, some or all of: wipers, windows, ambient lights, air ventilators, vehicle trunk, etc.

By way of example but not limitation, the audio story may be a kid story called "Sugar Monster." In the story, there is a monster stuck in the trunk and he wants to get out. The vehicle component metadata can be created at the content creation/production time and used at audio story rendering time, for example, to trigger the vehicle trunk to open to release the monster. As the monster walks on the car, the vehicle component metadata can be used to trigger the ambient lights in the car to match its footsteps. 3D or 360 degree audio rendering technologies may be used by the audio system (e.g., in-vehicle, built-in with the vehicle, etc.) to play back or generate/reproduce sounds at a specific angle and/or at a specific position in the vehicle. For example, when the monster is in the trunk, the voice of the monster may be rendered as coming from the rear of the vehicle. When it climbs on the top of the vehicle, the monster voice or sound moves to the rooftop.

FIG. 1F illustrates example vehicle component metadata for additional media rendering in addition to images and/or audio rendered with image display(s) and/or audio speaker(s).

As shown in FIG. 1F, the vehicle component metadata may be represented by a data table that includes one or more rows respectively corresponding to one or more vehicle component actions. For the purpose of illustration only, three rows are illustrated in FIG. 1F. It should be noted that, in various operational scenarios, more or fewer actions or rows may be defined in the vehicle component metadata.

Each of the one or more rows in the vehicle component metadata may include a plurality of columns respectively corresponding to vehicle metadata fields or attributes such as "Start Time," "Duration", "Trigger Action," "Checks before action" "Action", "Signals", and so on. It should be noted that, in various operational scenarios, more or fewer fields/attributes or columns may be defined for an action or row in the vehicle component metadata.

An action represented in a (e.g., each, etc.) row is named or identified in the "Action" field/attribute or column of the row. The "Start Time" and "Duration" field(s)—if available—may be used to specify timing information of the action represented in the row of the vehicle component metadata. Relatively low level signals used to effectuate the action such as KCAN messages to be exchanged with underlying vehicle component controllers of the vehicle may be specified in the "Signals" field/attribute or column of the row. For simplicity, most if not all explicit low level signals are not shown or illustrated in the table of FIG. 1F; however, it should be understood that specific signals such as specific KCAN messages are used to carry out each specific action represented in the vehicle component metadata of FIG. 1F.

Conditions to be satisfied or checked before carrying out the action may be specified in the "Checks before action" field/attribute or column of the row. Physical or special effects such as user perceivable vehicle actions caused or triggered by the action may be specified in the "Trigger Action" field/attribute or column of the row.

For example, a first action "read status from CAN" is represented in the very first row and is specifically named or identified in the "Action" field/attribute or column of the row. The "Start Time" and "Duration" field(s) specifies that the first action is to be performed before the start of the media content or audio story such as "Sugar Monster." Relatively low level signals under various groupings such as "car ON/OFF", etc. may be used to effectuate the first action. Conditions to be satisfied or checked before carrying out the first action such as "check if doors, windows, sunroof, trunk is closed," etc., are specified in the "Checks before action" field/attribute or column of the row. No physical or special effects are specified in the "Trigger Action" field/attribute or column of the row, as the media content or audio story such as "Sugar Monster" is yet to be played or rendered.

Similarly, a second action "open trunk lid" is represented in the second row and is specifically named or identified in the "Action" field/attribute or column of the row. The "Start Time" and "Duration" field(s) specifies that the second action is to be performed at a start time corresponding to the playback time point of 0:00:40.625 (the first number represents hour; the second number represents minutes; the third number before the dot represents seconds; the fourth number represents milliseconds) of the media content or audio story such as "Sugar Monster." Relatively low level signals (not shown in the "Signal" column for simplicity) may be used to effectuate the second action. Conditions to be satisfied or checked before carrying out the second action such as "check trunk status," etc., are specified in the "Checks before action" field/attribute or column of the row. Physical or special effects such as "trunk open," etc., are specified in the "Trigger Action" field/attribute or column of the row, as the media content or audio story such as "Sugar Monster" is being played or rendered.

A third action "shake seat" is represented in the third row and is specifically named or identified in the "Action" field/attribute or column of the row. The "Start Time" and "Duration" field(s) specifies that the third action is to be performed at a start time corresponding to the playback time point of 0:00:46.125 of the media content or audio story such as "Sugar Monster" for a time duration of nine (9) seconds. Relatively low level signals (not shown in the "Signal" column for simplicity) may be used to effectuate the third action. Conditions to be satisfied or checked before carrying out the third action may be specified—in this example, none—in the "Checks before action" field/attribute or column of the row. Physical or special effects such as "car shakes," "seats vibrate," etc., are specified in the "Trigger Action" field/attribute or column of the row, as the media content or audio story such as "Sugar Monster" is being played or rendered.

3.9. Vehicle Components Rendering Operations

The system 100 or the media discovery and rendering core 102 therein may include or implement a vehicle component media application 126 of FIG. 1D to perform vehicle component or special effect media rendering operations.

As illustrated in FIG. 1D, the vehicle component media application 126 may include a (vehicle component or special effect) media application manager 128, a (vehicle component or special effect) action manager 130, a vehicle component controller 132, etc. Some or all of the vehicle component media application 126 may be developed, implemented, coded, compiled, and/or linked (e.g., with standard based or proprietary libraries for vehicle based computing application, Python libraries, etc.) into executables using one or more relatively high level computing languages including but not limited to Python, C, C++, etc. Some or all of the vehicle component media application 126 may run on, or may be executed by, one or more hardware processor cores and may serve as a hardware interface between the media discovery and rendering core 102 (and/or the POI navigation application 104) and vehicle components of the vehicle.

The vehicle component controller may be communicatively linked or interfaced with some or all of the vehicle components—e.g., seats, wipers, etc.—through the vehicle component control gateway 116 using communication protocols such as VIWI, KCAN, K2-CAN, Vector CancaseXL, etc., over one or more network/data connections. Example network/data connections deployed in the vehicle to communicate with vehicle components or controllers thereof may include, but are not necessarily limited to only, any of: USB data links, CANs, ethernets, MQTT, etc.

The (vehicle component or special effect) media application manager 128 may be configured or implemented to handle the main loop or the main processing path/logic of the overall vehicle component media application 126. The application manager 128 initializes other managers or controllers implemented in the vehicle component media application 126 and handles processing tasks relating to (e.g., main, vehicle component originated, immersive media player originated, managers/controllers originated, etc.) events. For example, the application manager 128 can be used to receive and process (e.g., event, non-event, etc.) messages, vehicle (component) status changes, etc.

The immersive media player 124 in the media discovery and rendering core 102 may operate or interface with the application manager 128 in the vehicle component media application 126. The application manager 128 receives immersive play commands or requests generated based on one or more (vehicle component) actions as specified in one or more rows in vehicle component metadata as illustrated in FIG. 1F from the immersive media player 124. These actions may be synchronized to specific time points of audio or video/image rendering (or playback) operations. In response, the application manager 128 can forward the immersive play commands or requests to the (vehicle component or special effect) action manager 130.

In response to receiving the immersive play commands or requests that contain vehicle component metadata portions specified in the one or more rows in the vehicle component metadata, the action manager 130 can convert the vehicle component metadata portions into specific (vehicle component controller bound) signals.

In response to receiving specific (vehicle component controller bound) signals from the action manager 130, the vehicle component controller 132 can send or route these signals to relatively low level controllers of specific vehicle components by way of the vehicle component controller gateway 110 to carry out specific operations in connection with the specific vehicle components as specified in the immersive play commands or requests.

4.0. Example Process Flows

Figure 4D:
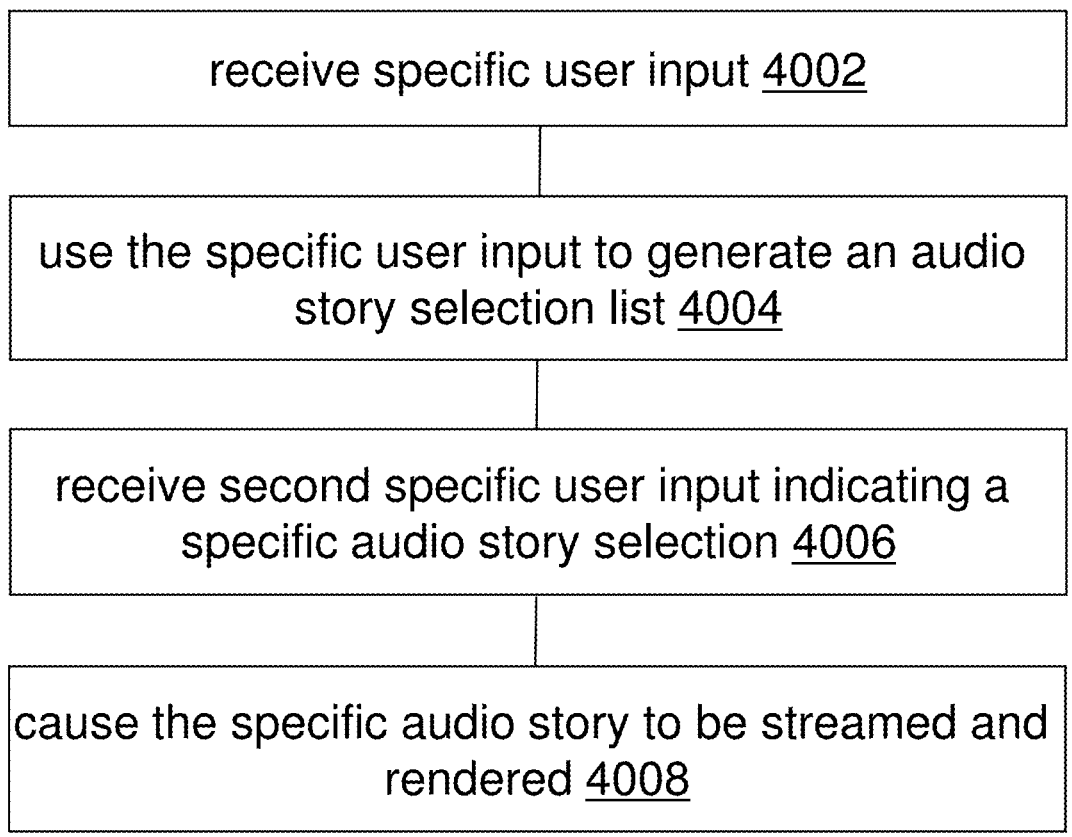

FIG. 4D illustrates an example process flow 4000 according to an embodiment. In some embodiments, one or more computing devices or components may perform this process flow. In block 4002, a (e.g., in-vehicle media rendering, etc.) system as described herein receives specific user input through an in-vehicle user interface device built in with a vehicle while the in-vehicle user interface device is concurrently displaying a navigation map visually depicting a geographic area in connection with a current position of the vehicle.

In block 4004, the system uses the specific user input to generate an audio story selection list that includes a plurality of audio story selections, the plurality of audio story selections including one or more specific audio story selections respectively for one or more audio stories relating to one or more geographic locations within the geographic area depicted on the navigation map.

In block 4006, the system receives second specific user input through the in-vehicle user interface device, the second specific user input indicating a specific audio story selection among the one or more specific audio story selections, the specific audio story selection corresponding to a selection of a specific audio story, among the one or more audio stories, that relates to a specific geographic locations among the one or more geographic locations within the geographic area depicted on the navigation map.

In block 4008, in response to receiving the second specific user input, the system causes the specific audio story to be streamed from a specific media content source and rendered through an in-vehicle audio system built in with the vehicle.

In an embodiment, the one or more geographic locations are visually indicated on the navigation map; the system further performs: causing the specific geographic location, to which the currently played specific audio story relates, to be visually rendered differently from others of the one or more geographic locations on the navigation map.

In an embodiment, the same in-vehicle user interface is used by a user to control at least one of: vehicle window operations, vehicle seat operations, vehicle wiper operations, vehicle sunroof operations, vehicle temperature operations, vehicle light operations, vehicle door operations, vehicle trunk operations, vehicle ventilation operations, etc.

In an embodiment, the audio story selection list is visually rendered in a first portion of an image display of the in-vehicle user interface, while the navigation map is concurrently visually rendered on a second non-overlapping portion of the image display.

In an embodiment, the system further performs: in response to receiving the second specific user input, providing through the in-vehicle user interface one or more user interface controls for performing one or more actions relating to the specific geographic locations.

In an embodiment, the geographic area visually depicted in the navigation map represents: one of a geographic area surrounding the current position of the vehicle; a geographic area surrounding a geographic location to which the vehicle is destined on a trip; or a geographic area surrounding a route along which the vehicle is specified to be traveling.

In an embodiment, the one or more audio stories are selected from a plurality of audio stories sourced from a plurality of different media content sources including the specific media content source.

Figure 4E:
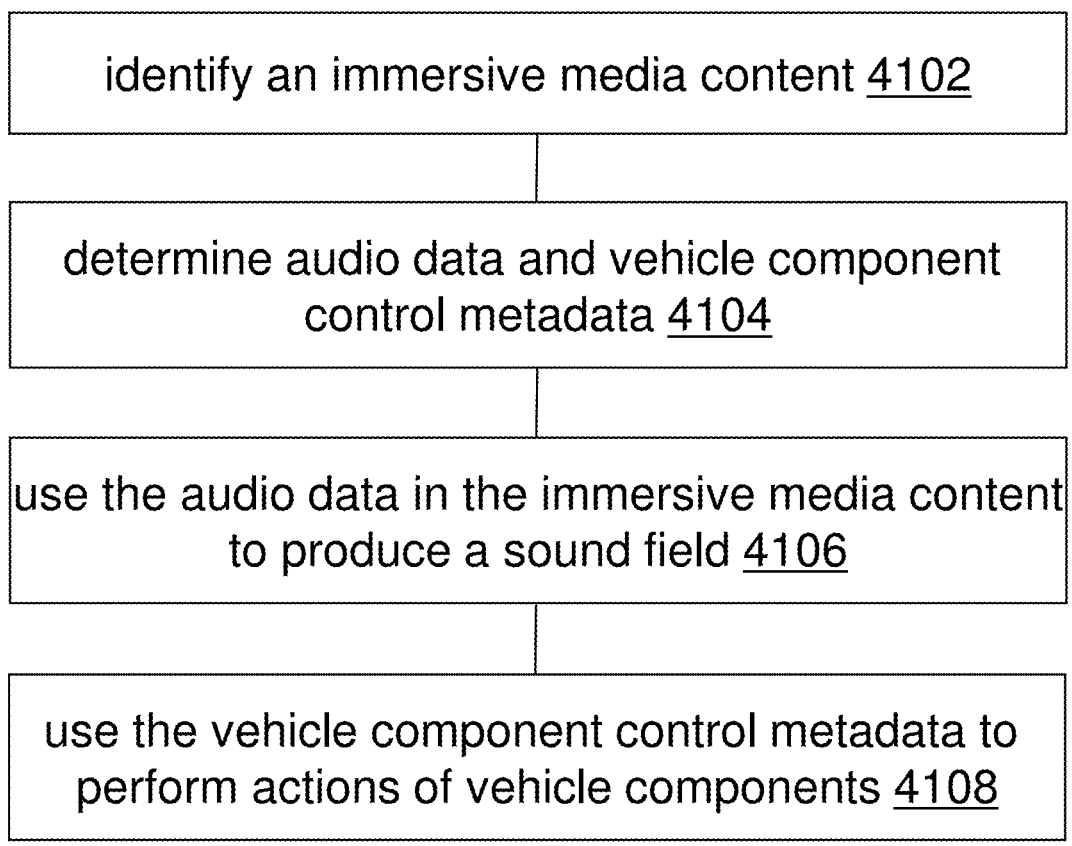

FIG. 4E illustrates an example process flow 4100 according to an embodiment. In some embodiments, one or more computing devices or components may perform this process flow. In block 4102, a (e.g., in-vehicle media rendering, etc.) system as described herein identifies an immersive media content to be played back in a vehicle, the immersive media content being authored for rendering in a vehicle-specific media rendering environment. The immersive media content may be identified through user input received with a user interface interacting with a user. Additionally, optionally or alternatively, the immersive media content may be automatically identified or generated—with no or little manual user input—based on user preferences and past media selections made by or for the user.

In block 4104, the system determines audio data in the immersive media content and vehicle component control metadata in the immersive media content, the audio data to be audibly rendered through an in-vehicle audio system built in with the vehicle.

In block 4106, the system uses the audio data in the immersive media content to generate sound waves with a set of one or more audio speakers of the in-vehicle audio system, the sound waves producing an in-vehicle sound field for a user inside the vehicle to audibly perceive.

In block 4108, the system uses the vehicle component control metadata in the immersive media content to perform one or more actions of one or more vehicle components of the vehicle, the one or more actions of the one or more vehicle components being synchronized by way of the vehicle component control metadata to one or more specific playback times in a playback time duration represented in the immersive media content.

In an embodiment, the audio system built in with the vehicle represents a three-dimensional audio system that is configured to generate the sound field to depict an audio source at a specific spatial location in relation to the user according to audio metadata in the immersive media content.

In an embodiment, the sound field audibly depicts one or more characters; at least one of the one or more characters is audibly depicted to be interacting in real time with at least one of the one or more vehicle components in the vehicle to perform one of the one or more actions at one of the one or more specific playback times.

In an embodiment, the audio data and the vehicle component control metadata are included and received in a same media data stream for the immersive media content.

In an embodiment, the one or more vehicle components include one or more of: one or more windows, one or more seatbelts, one or more door locks, one or more strip lights, one or more wipers, one or more wiper fluid sprayers, one or more seat heating units, one or more seat coolers, one or more cabin temperature controls, one or more ambient lights, sunroof, one or more in-cabin lights, one or more door projection light, one or more air ventilators, one or more seat massagers, one or more seat setting controllers, one or more vehicle modules, etc.

In an embodiment, spatial locations of audio objects depicted in the sound field in relation to the user are specified in audio metadata in the immersive media content; at least one of the spatial positions of the audio objects depicted in the sound field is synchronized with an action in the one or more actions of the one or more vehicle components as specified in vehicle component control metadata.

In an embodiment, an in-vehicle media rendering system that renders the immersive media content directs a vehicle component control gateway to send vehicle control signals to controllers of the one or more vehicle components over one or more vehicle built-in data communication networks to effectuate the one or more actions of the one or more vehicle components; the vehicle control signals are generated based at least in part on the vehicle component control metadata.

In an embodiment, a computing device is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Other examples of these and other embodiments are found throughout this disclosure. Note that, although separate embodiments are discussed herein, any combination of embodiments and/or partial embodiments discussed herein may be combined to form further embodiments.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 5:
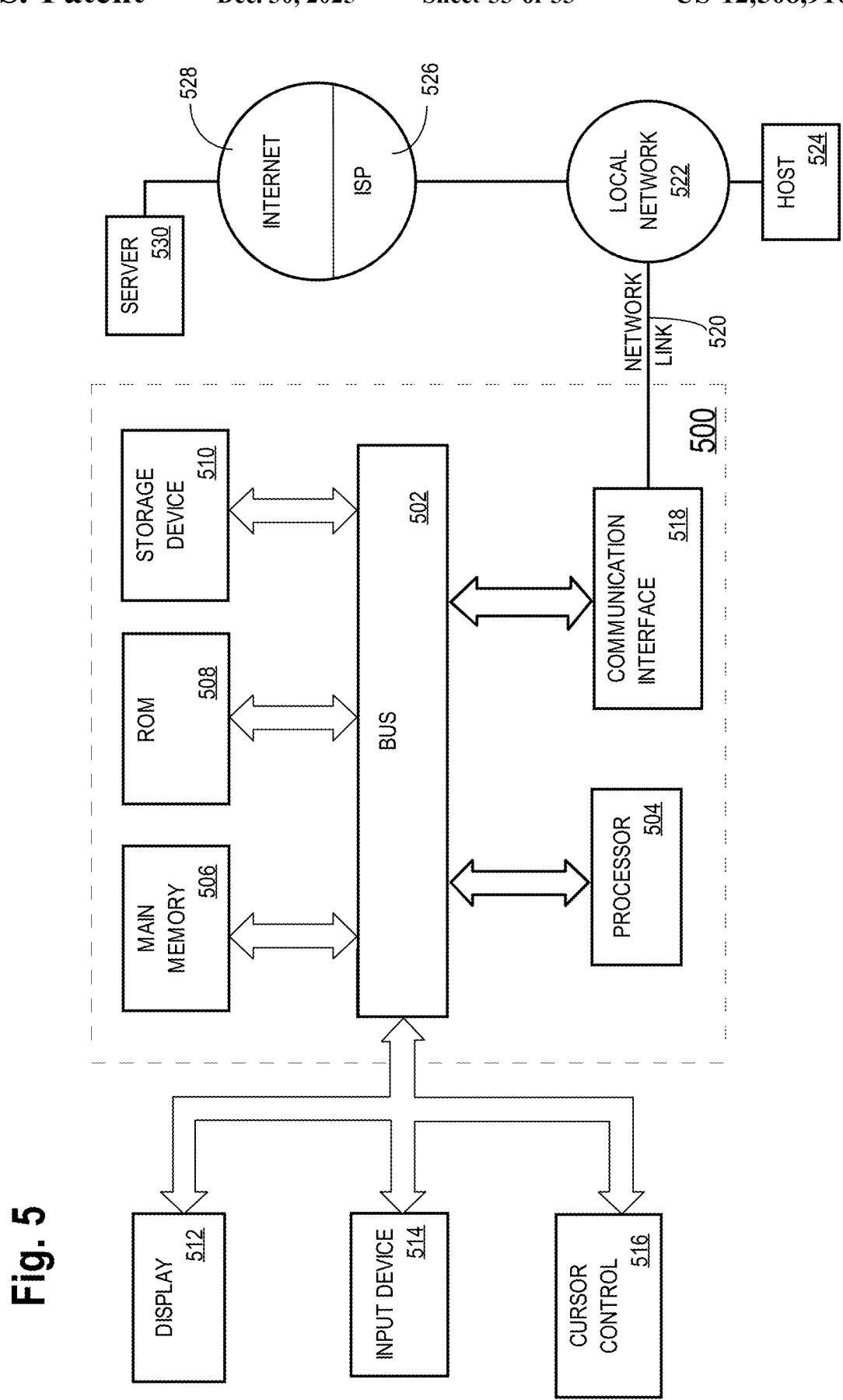
FIG. 5 is block diagram of a computer system upon which embodiments of the invention may be implemented.

FIG. 5 is a block diagram that illustrates a computer system 500 utilized in implementing the above-described techniques, according to an embodiment. Computer system 500 may be, for example, a desktop computing device, laptop computing device, tablet, smartphone, server appliance, computing main image, multimedia device, handheld device, networking apparatus, or any other suitable device.

Computer system 500 includes one or more busses 502 or other communication mechanism for communicating information, and one or more hardware processors 504 coupled with busses 502 for processing information. Hardware processors 504 may be, for example, a general purpose microprocessor. Busses 502 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 500 also includes a main memory 506, such as a random access memory (RAM) or other dynamic or volatile storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes one or more read only memories (ROM) 508 or other static storage devices coupled to bus 502 for storing static information and instructions for processor 504. One or more storage devices 510, such as a solid-state drive (SSD), magnetic disk, optical disk, or other suitable non-volatile storage device, is provided and coupled to bus 502 for storing information and instructions.

Computer system 500 may be coupled via bus 502 to one or more displays 512 for presenting information to a computer user. For instance, computer system 500 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 512 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 512.

In an embodiment, output to display 512 may be accelerated by one or more graphics processing unit (GPUs) in computer system 500. A GPU may be, for example, a highly parallelized, multi-core floating point processing unit highly optimized to perform computing operations related to the display of graphics data, 3D data, and/or multimedia. In addition to computing image and/or video data directly for output to display 512, a GPU may also be used to render imagery or other video data off-screen, and read that data back into a program for off-screen image processing with very high performance. Various other computing tasks may be off-loaded from the processor 504 to the GPU.

One or more input devices 514 are coupled to bus 502 for communicating information and command selections to processor 504. One example of an input device 514 is a keyboard, including alphanumeric and other keys. Another type of user input device 514 is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Yet other examples of suitable input devices 514 include a touch-screen panel affixed to a display 512, cameras, microphones, accelerometers, motion detectors, and/or other sensors. In an embodiment, a network-based input device 514 may be utilized. In such an embodiment, user input and/or other information or commands may be relayed via routers and/or switches on a Local Area Network (LAN) or other suitable shared network, or via a peer-to-peer network, from the input device 514 to a network link 520 on the computer system 500.

A computer system 500 may implement techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 500 can receive the data on the network and demodulate the signal to decode the transmitted instructions. Appropriate circuitry can then place the data on bus 502. Bus 502 carries the data to main memory 505, from which processor 504 retrieves and executes the instructions. The instructions received by main memory 506 may optionally be stored on storage device 510 either before or after execution by processor 504.

A computer system 500 may also include, in an embodiment, one or more communication interfaces 518 coupled to bus 502. A communication interface 518 provides a data communication coupling, typically two-way, to a network link 520 that is connected to a local network 522. For example, a communication interface 518 may be an integrated services digital network (ISDN) card, cable modem, satellite modem, or a modem to provide a data communication connection to a corresponding type of telephone line. As another example, the one or more communication interfaces 518 may include a local area network (LAN) card to provide a data communication connection to a compatible LAN. As yet another example, the one or more communication interfaces 518 may include a wireless network interface controller, such as a 802.11-based controller, Bluetooth controller, Long Term Evolution (LTE) modem, and/or other types of wireless interfaces. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by a Service Provider 526. Service Provider 526, which may for example be an Internet Service Provider (ISP), in turn provides data communication services through a wide area network, such as the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

In an embodiment, computer system 500 can send messages and receive data, including program code and/or other types of instructions, through the network(s), network link 520, and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. As another example, information received via a network link 520 may be interpreted and/or processed by a software component of the computer system 500, such as a web browser, application, or server, which in turn issues instructions based thereon to a processor 504, possibly via an operating system and/or other intermediate layers of software components.

In an embodiment, some or all of the systems described herein may be or comprise server computer systems, including one or more computer systems 500 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
identifying an immersive media content to be played back in a vehicle, the immersive media content being authored for rendering in a vehicle-specific media rendering environment;
determining audio data in the immersive media content and vehicle component control metadata in the immersive media content, the audio data to be audibly rendered through an in-vehicle audio system built in with the vehicle;
using the audio data in the immersive media content to generate sound waves with a set of one or more audio speakers of the in-vehicle audio system, the sound waves producing an in-vehicle sound field for a user inside the vehicle to audibly perceive;
using the vehicle component control metadata in the immersive media content to control one or more actions of one or more vehicle components of the vehicle, the one or more actions of the one or more vehicle components being synchronized by way of the vehicle component control metadata to one or more specific playback times in a playback time duration represented in the immersive media content.

2. The method of claim 1, wherein the in-vehicle audio system built in with the vehicle represents a three-dimensional audio system that is configured to generate the in-vehicle sound field to depict an audio source at a specific spatial location in relation to the user according to audio metadata in the immersive media content.

3. The method of claim 1, wherein the in-vehicle sound field audibly depicts one or more characters; wherein at least one of the one or more characters is audibly depicted to be interacting in real time with at least one of the one or more vehicle components in the vehicle to perform one of the one or more actions at one of the one or more specific playback times.

4. The method of claim 1, wherein the audio data and the vehicle component control metadata are included and received in a same media data stream for the immersive media content.

5. The method of claim 1, wherein the one or more vehicle components include one or more of: one or more windows, one or more seatbelts, one or more door locks, one or more strip lights, one or more wipers, one or more wiper fluid sprayers, one or more seat heating units, one or more seat coolers, one or more cabin temperature controls, one or more ambient lights, sunroof, one or more in-cabin lights, one or more door projection light, one or more air ventilators, one or more seat massagers, or one or more seat setting controllers.

6. The method of claim 1, wherein spatial locations of audio objects depicted in the in-vehicle sound field in relation to the user are specified in audio metadata in the immersive media content;
wherein at least one of the spatial positions of the audio objects depicted in the sound field is synchronized with an action in the one or more actions of the one or more vehicle components as specified in vehicle component control metadata.

7. The method of claim 1, wherein an in-vehicle media rendering system that renders the immersive media content directs a vehicle component control gateway to send vehicle control signals to controllers of the one or more vehicle components over one or more vehicle built-in data communication networks to effectuate the one or more actions of the one or more vehicle components;
wherein the vehicle control signals are generated based at least in part on the vehicle component control metadata.

8. A non-transitory computer readable medium storing a program of instructions that is executable by a computer to perform:
identifying an immersive media content to be played back in a vehicle, the immersive media content being authored for rendering in a vehicle-specific media rendering environment;
determining audio data in the immersive media content and vehicle component control metadata in the immersive media content, the audio data to be audibly rendered through an in-vehicle audio system built in with the vehicle;
using the audio data in the immersive media content to generate sound waves with a set of one or more audio speakers of the in-vehicle audio system, the sound waves producing an in-vehicle sound field for a user inside the vehicle to audibly perceive;
using the vehicle component control metadata in the immersive media content to control one or more actions of one or more vehicle components of the vehicle, the one or more actions of the one or more vehicle components being synchronized by way of the vehicle component control metadata to one or more specific playback times in a playback time duration represented in the immersive media content.

9. The media non-transitory computer readable medium of claim 8, wherein the in-vehicle audio system built in with the vehicle represents a three-dimensional audio system that is configured to generate the in-vehicle sound field to depict an audio source at a specific spatial location in relation to the user according to audio metadata in the immersive media content.

10. The non-transitory computer readable medium of claim 8, wherein the in-vehicle sound field audibly depicts one or more characters; wherein at least one of the one or more characters is audibly depicted to be interacting in real time with at least one of the one or more vehicle components in the vehicle to perform one of the one or more actions at one of the one or more specific playback times.

11. The non-transitory computer readable medium of claim 8, wherein the audio data and the vehicle component control metadata are included and received in a same media data stream for the immersive media content.

12. The non-transitory computer readable medium of claim 8, wherein the one or more vehicle components include one or more of: one or more windows, one or more seatbelts, one or more door locks, one or more strip lights, one or more wipers, one or more wiper fluid sprayers, one or more seat heating units, one or more seat coolers, one or more cabin temperature controls, one or more ambient lights, sunroof, one or more in-cabin lights, one or more door projection light, one or more air ventilators, one or more seat massagers, or one or more seat setting controllers.

13. The non-transitory computer readable medium of claim 8, wherein spatial locations of audio objects depicted in the in-vehicle sound field in relation to the user are specified in audio metadata in the immersive media content; wherein at least one of the spatial positions of the audio objects depicted in the sound field is synchronized with an action in the one or more actions of the one or more vehicle components as specified in vehicle component control metadata.

14. The non-transitory computer readable medium of claim 8, wherein an in-vehicle media rendering system that renders the immersive media content directs a vehicle component control gateway to send vehicle control signals to controllers of the one or more vehicle components over one or more vehicle built-in data communication networks to effectuate the one or more actions of the one or more vehicle components; wherein the vehicle control signals are generated based at least in part on the vehicle component control metadata.

15. A system, comprising:
one or more computing processors;
one or more non-transitory computer readable media storing a program of instructions that is executable by the one or more computing processors to perform:
identifying an immersive media content to be played back in a vehicle, the immersive media content being authored for rendering in a vehicle-specific media rendering environment;
determining audio data in the immersive media content and vehicle component control metadata in the immersive media content, the audio data to be audibly rendered through an in-vehicle audio system built in with the vehicle;
using the audio data in the immersive media content to generate sound waves with a set of one or more audio speakers of the in-vehicle audio system, the sound waves producing an in-vehicle sound field for a user inside the vehicle to audibly perceive;
using the vehicle component control metadata in the immersive media content to control one or more actions of one or more vehicle components of the vehicle, the one or more actions of the one or more vehicle components being synchronized by way of the vehicle component control metadata to one or more specific playback times in a playback time duration represented in the immersive media content.

16. The system of claim 15, wherein the in-vehicle audio system built in with the vehicle represents a three-dimensional audio system that is configured to generate the in-vehicle sound field to depict an audio source at a specific spatial location in relation to the user according to audio metadata in the immersive media content.

17. The system of claim 15, wherein the in-vehicle sound field audibly depicts one or more characters;
wherein at least one of the one or more characters is audibly depicted to be interacting in real time with at least one of the one or more vehicle components in the vehicle to perform one of the one or more actions at one of the one or more specific playback times.

18. The system of claim 15, wherein the audio data and the vehicle component control metadata are included and received in a same media data stream for the immersive media content.

19. The system of claim 15, wherein the one or more vehicle components include one or more of: one or more windows, one or more seatbelts, one or more door locks, one or more strip lights, one or more wipers, one or more wiper fluid sprayers, one or more seat heating units, one or more seat coolers, one or more cabin temperature controls, one or more ambient lights, sunroof, one or more in-cabin lights, one or more door projection light, one or more air ventilators, one or more seat massagers, or one or more seat setting controllers.

20. The system of claim 15, wherein spatial locations of audio objects depicted in the sound field in relation to the user are specified in audio metadata in the immersive media content; wherein at least one of the spatial positions of the audio objects depicted in the sound field is synchronized with an action in the one or more actions of the one or more vehicle components as specified in vehicle component control metadata.

21. The system of claim 15, wherein an in-vehicle media rendering system that renders the immersive media content directs a vehicle component control gateway to send vehicle control signals to controllers of the one or more vehicle components over one or more vehicle built-in data communication networks to effectuate the one or more actions of the one or more vehicle components;
wherein the vehicle control signals are generated based at least in part on the vehicle component control metadata.

* * * * *

UNITED STATES PATENT AND TRADEMARK OFFICE
CERTIFICATE OF CORRECTION

PATENT NO. : 12,508,910 B2
APPLICATION NO. : 18/511372
DATED : December 30, 2025
INVENTOR(S) : Vince Tulit et al.

Page 1 of 1

It is certified that error appears in the above-identified patent and that said Letters Patent is hereby corrected as shown below:

In the Claims

Column 33
Claim 9: Line 5: Delete "media"

Signed and Sealed this
Third Day of February, 2026

John A. Squires
*Director of the United States Patent and Trademark Office*